US009691220B2

(12) United States Patent
Arnone et al.

(10) Patent No.: US 9,691,220 B2
(45) Date of Patent: *Jun. 27, 2017

(54) ANTI-SANDBAGGING IN HEAD-TO-HEAD GAMING FOR ENRICHED GAME PLAY ENVIRONMENT

(71) Applicant: Gamblit Gaming, LLC, Glendale, CA (US)

(72) Inventors: Miles Arnone, Sherborn, MA (US); Frank Cire, Pasadena, CA (US); Eric Meyerhofer, Pasadena, CA (US); Caitlyn Ross, Watertown, MA (US)

(73) Assignee: Gamblit Gaming, LLC, Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/133,624

(22) Filed: Apr. 20, 2016

(65) Prior Publication Data

US 2016/0232747 A1    Aug. 11, 2016

Related U.S. Application Data

(63) Continuation of application No. 14/270,335, filed on May 5, 2014, now Pat. No. 9,349,249, which is a
(Continued)

(51) Int. Cl.
*A63F 13/00* (2014.01)
*G07F 17/32* (2006.01)
*A63F 13/79* (2014.01)

(52) U.S. Cl.
CPC .......... *G07F 17/3227* (2013.01); *A63F 13/79* (2014.09); *G07F 17/326* (2013.01);
(Continued)

(58) Field of Classification Search
None
See application file for complete search history.

(56) References Cited

U.S. PATENT DOCUMENTS 5,413,357 A    5/1995  Schulze et al.
5,718,429 A    2/1998  Keller
(Continued)

FOREIGN PATENT DOCUMENTS

JP    2001300098 A    10/2001
JP    2003111980 A     4/2003
(Continued)

OTHER PUBLICATIONS

U.S. Appl. No. 14/586,645 Arnone, et al. filed Dec. 30, 2014.
(Continued)

*Primary Examiner* — Jason Yen
(74) *Attorney, Agent, or Firm* — Caitlyn Ross

(57) ABSTRACT

An electromechanical gaming machine constructed to receive real world credits from a user, and operate an anti-sandbagging wagering system. One embodiment includes an entertainment controller, a game world controller, and a real world controller. The entertainment controller generates a skill-based entertainment game, records user identification information, receives the user's interactions, determines the user's level of skill, associates it with the user's identification information, and communicates user information to the game world controller; the real world controller, determines a gambling outcome for a wager, and the game world controller instructs the real world controller to execute the wager based on the user's interaction with the skill-based entertainment game, receives the user information, generates an anti-sandbagging provision that triggers a user identity confirmation, applies the anti-sandbagging provision, and performs the user identity confirmation.

18 Claims, 9 Drawing Sheets

Related U.S. Application Data continuation of application No. 13/917,529, filed on Jun. 13, 2013, now Pat. No. 8,715,068, which is a continuation of application No. PCT/US2012/060679, filed on Oct. 17, 2012.

(60) Provisional application No. 61/627,769, filed on Oct. 17, 2011, provisional application No. 61/627,737, filed on Oct. 17, 2011, provisional application No. 61/627,749, filed on Oct. 17, 2011.

(52) U.S. Cl.
CPC ...... *G07F 17/3206* (2013.01); *G07F 17/3239* (2013.01); *G07F 17/3244* (2013.01); *G07F 17/3241* (2013.01)

(56) References Cited

U.S. PATENT DOCUMENTS

| | | | |
|---|---|---|---|
| 5,785,592 A | 7/1998 | Jacobsen | |
| 5,853,324 A | 12/1998 | Kami et al. | |
| 5,963,745 A | 10/1999 | Collins et al. | |
| 6,050,895 A | 4/2000 | Luciano | |
| 6,165,071 A | 12/2000 | Weiss | |
| 6,227,974 B1 | 5/2001 | Eilat | |
| 6,267,669 B1 | 7/2001 | Luciano | |
| 6,685,563 B1 | 2/2004 | Meekins et al. | |
| 6,712,693 B1 | 3/2004 | Hettinger | |
| 6,761,632 B2 | 7/2004 | Bansemer et al. | |
| 6,761,633 B2 | 7/2004 | Riendeau | |
| 6,764,397 B1 | 7/2004 | Robb | |
| 6,811,482 B2 | 11/2004 | Letovsky | |
| 7,118,105 B2 | 10/2006 | Benevento | |
| 7,294,058 B1 | 11/2007 | Slomiany | |
| 7,326,115 B2 | 2/2008 | Baerlocher | |
| 7,361,091 B2 | 4/2008 | Letovsky | |
| 7,517,282 B1 | 4/2009 | Pryor | |
| 7,575,517 B2 | 8/2009 | Parham et al. | |
| 7,682,239 B2 | 3/2010 | Friedman et al. | |
| 7,720,733 B2 | 5/2010 | Jung | |
| 7,753,770 B2 | 7/2010 | Walker et al. | |
| 7,753,790 B2 | 7/2010 | Nguyen | |
| 7,766,742 B2 | 8/2010 | Bennett et al. | |
| 7,775,885 B2 | 8/2010 | Van Luchene | |
| 7,798,896 B2 | 9/2010 | Katz | |
| 7,828,657 B2 | 11/2010 | Booth | |
| 7,917,371 B2 | 3/2011 | Jung et al. | |
| 7,931,531 B2 | 4/2011 | Oberberger | |
| 7,938,727 B1 | 5/2011 | Konkle | |
| 7,950,993 B2 | 5/2011 | Oberberger | |
| 7,967,674 B2 | 6/2011 | Baerlocher | |
| 7,980,948 B2 | 7/2011 | Rowe | |
| 7,996,264 B2 | 8/2011 | Kusumoto et al. | |
| 8,012,023 B2 | 9/2011 | Gates | |
| 8,047,908 B2 | 11/2011 | Walker | |
| 8,047,915 B2 | 11/2011 | Lyle | |
| 8,060,829 B2 | 11/2011 | Jung et al. | |
| 8,075,383 B2 | 12/2011 | Friedman et al. | |
| 8,087,999 B2 | 1/2012 | Oberberger | |
| 8,113,938 B2 | 2/2012 | Friedman et al. | |
| 8,118,654 B1 | 2/2012 | Nicolas | |
| 8,128,487 B2 | 3/2012 | Hamilton et al. | |
| 8,135,648 B2 | 3/2012 | Oram | |
| 8,137,193 B1 | 3/2012 | Kelly et al. | |
| 8,142,272 B2 | 3/2012 | Walker | |
| 8,157,653 B2 | 4/2012 | Buhr | |
| 8,167,699 B2 | 5/2012 | Inamura | |
| 8,177,628 B2 | 5/2012 | Manning | |
| 8,182,338 B2 | 5/2012 | Thomas | |
| 8,182,339 B2 | 5/2012 | Anderson | |
| 8,187,068 B2 | 5/2012 | Slomiany | |
| 8,206,210 B2 | 6/2012 | Walker | |
| 8,308,544 B2 | 11/2012 | Friedman | |
| 8,430,735 B2 | 4/2013 | Oberberger | |
| 8,475,266 B2 | 7/2013 | Arnone | |
| 8,480,470 B2 | 7/2013 | Napolitano et al. | |
| 8,622,809 B1 | 1/2014 | Arora et al. | |
| 8,864,564 B2 | 10/2014 | Oberberger | |
| 2001/0004609 A1 | 6/2001 | Walker et al. | |
| 2001/0019965 A1 | 9/2001 | Ochi | |
| 2002/0022509 A1 | 2/2002 | Nicastro | |
| 2002/0090990 A1 | 7/2002 | Joshi et al. | |
| 2002/0175471 A1 | 11/2002 | Faith | |
| 2003/0060286 A1 | 3/2003 | Walker et al. | |
| 2003/0119576 A1 | 6/2003 | McClintic et al. | |
| 2003/0139214 A1 | 7/2003 | Wolf et al. | |
| 2003/0171149 A1 | 9/2003 | Rothschild | |
| 2003/0204565 A1 | 10/2003 | Guo et al. | |
| 2003/0211879 A1 | 11/2003 | Englman | |
| 2004/0092313 A1 | 5/2004 | Saito et al. | |
| 2004/0102238 A1 | 5/2004 | Taylor | |
| 2004/0121839 A1 | 6/2004 | Webb | |
| 2004/0225387 A1 | 11/2004 | Smith | |
| 2005/0003878 A1 | 1/2005 | Updike | |
| 2005/0096124 A1 | 5/2005 | Stronach | |
| 2005/0116411 A1 | 6/2005 | Herrmann et al. | |
| 2005/0192087 A1 | 9/2005 | Friedman et al. | |
| 2005/0233791 A1 | 10/2005 | Kane | |
| 2005/0233806 A1 | 10/2005 | Kane et al. | |
| 2005/0239538 A1* | 10/2005 | Dixon | G07F 17/3267 463/20 |
| 2005/0269778 A1 | 12/2005 | Samberg | |
| 2005/0288101 A1 | 12/2005 | Lockton et al. | |
| 2005/0288103 A1* | 12/2005 | Konuma | A63F 13/12 463/42 |
| 2006/0003823 A1 | 1/2006 | Zhang | |
| 2006/0003830 A1 | 1/2006 | Walker et al. | |
| 2006/0035696 A1 | 2/2006 | Walker | |
| 2006/0040735 A1 | 2/2006 | Baerlocher | |
| 2006/0068913 A1 | 3/2006 | Walker et al. | |
| 2006/0084499 A1 | 4/2006 | Moshal | |
| 2006/0084505 A1 | 4/2006 | Yoseloff | |
| 2006/0135250 A1 | 6/2006 | Rossides | |
| 2006/0154710 A1 | 7/2006 | Serafat | |
| 2006/0166729 A1 | 7/2006 | Saffari et al. | |
| 2006/0189371 A1 | 8/2006 | Walker et al. | |
| 2006/0189381 A1 | 8/2006 | Daniel et al. | |
| 2006/0223611 A1 | 10/2006 | Baerlocher | |
| 2006/0234791 A1 | 10/2006 | Nguyen et al. | |
| 2006/0240890 A1 | 10/2006 | Walker | |
| 2006/0246403 A1 | 11/2006 | Monpouet et al. | |
| 2006/0258433 A1 | 11/2006 | Finocchio et al. | |
| 2007/0026924 A1 | 2/2007 | Taylor | |
| 2007/0035548 A1 | 2/2007 | Jung et al. | |
| 2007/0038559 A1 | 2/2007 | Jung et al. | |
| 2007/0064074 A1 | 3/2007 | Silverbrook et al. | |
| 2007/0087799 A1 | 4/2007 | Van Luchene | |
| 2007/0093299 A1 | 4/2007 | Bergeron | |
| 2007/0099696 A1 | 5/2007 | Nguyen et al. | |
| 2007/0117641 A1 | 5/2007 | Walker et al. | |
| 2007/0129149 A1 | 6/2007 | Walker | |
| 2007/0156509 A1 | 7/2007 | Jung et al. | |
| 2007/0167212 A1 | 7/2007 | Nguyen | |
| 2007/0167239 A1 | 7/2007 | O'Rourke | |
| 2007/0173311 A1 | 7/2007 | Morrow et al. | |
| 2007/0191104 A1 | 8/2007 | Van Luchene | |
| 2007/0203828 A1 | 8/2007 | Jung et al. | |
| 2007/0207847 A1 | 9/2007 | Thomas | |
| 2007/0259717 A1 | 11/2007 | Mattice | |
| 2007/0293306 A1 | 12/2007 | Nee et al. | |
| 2008/0004107 A1* | 1/2008 | Nguyen | G06Q 10/10 463/29 |
| 2008/0014835 A1 | 1/2008 | Weston et al. | |
| 2008/0015004 A1 | 1/2008 | Gatto et al. | |
| 2008/0064488 A1 | 3/2008 | Oh | |
| 2008/0070659 A1 | 3/2008 | Naicker | |
| 2008/0070690 A1 | 3/2008 | Van Luchene | |
| 2008/0070702 A1 | 3/2008 | Kaminkow | |
| 2008/0096665 A1 | 4/2008 | Cohen | |
| 2008/0108406 A1 | 5/2008 | Oberberger | |
| 2008/0108425 A1 | 5/2008 | Oberberger | |
| 2008/0113704 A1 | 5/2008 | Jackson | |
| 2008/0119283 A1 | 5/2008 | Baerlocher | |

(56) References Cited

U.S. PATENT DOCUMENTS

| | | |
|---|---|---|
| 2008/0146308 A1 | 6/2008 | Okada |
| 2008/0161081 A1 | 7/2008 | Berman |
| 2008/0176619 A1 | 7/2008 | Kelly |
| 2008/0191418 A1 | 8/2008 | Lutnick et al. |
| 2008/0195481 A1 | 8/2008 | Lutnick |
| 2008/0248850 A1 | 10/2008 | Schugar |
| 2008/0254893 A1 | 10/2008 | Patel |
| 2008/0274796 A1 | 11/2008 | Lube |
| 2008/0274798 A1 | 11/2008 | Walker et al. |
| 2008/0311980 A1 | 12/2008 | Cannon |
| 2008/0318668 A1 | 12/2008 | Ching |
| 2009/0011827 A1 | 1/2009 | Englman |
| 2009/0023489 A1 | 1/2009 | Toneguzzo |
| 2009/0023492 A1 | 1/2009 | Erfanian |
| 2009/0061974 A1 | 3/2009 | Lutnick et al. |
| 2009/0061975 A1 | 3/2009 | Ditchev |
| 2009/0061991 A1 | 3/2009 | Popovich |
| 2009/0061997 A1 | 3/2009 | Popovich |
| 2009/0061998 A1 | 3/2009 | Popovich |
| 2009/0061999 A1 | 3/2009 | Popovich |
| 2009/0075738 A1* | 3/2009 | Pearce ............... G07F 17/32 463/42 |
| 2009/0082093 A1 | 3/2009 | Okada |
| 2009/0088239 A1 | 4/2009 | Iddings |
| 2009/0098934 A1 | 4/2009 | Amour |
| 2009/0118006 A1 | 5/2009 | Kelly et al. |
| 2009/0124344 A1 | 5/2009 | Mitchell et al. |
| 2009/0131158 A1 | 5/2009 | Brunet De Courssou et al. |
| 2009/0131175 A1 | 5/2009 | Kelly et al. |
| 2009/0143141 A1 | 6/2009 | Wells |
| 2009/0149233 A1 | 6/2009 | Strause et al. |
| 2009/0156297 A1 | 6/2009 | Andersson et al. |
| 2009/0176560 A1 | 7/2009 | Herrmann et al. |
| 2009/0176566 A1 | 7/2009 | Kelly |
| 2009/0181777 A1 | 7/2009 | Christiani |
| 2009/0221355 A1 | 9/2009 | Dunaevsky et al. |
| 2009/0239610 A1 | 9/2009 | Olive |
| 2009/0247272 A1 | 10/2009 | Abe |
| 2009/0270164 A1 | 10/2009 | Seelig |
| 2009/0291755 A1 | 11/2009 | Walker et al. |
| 2009/0309305 A1 | 12/2009 | May |
| 2009/0312093 A1 | 12/2009 | Walker et al. |
| 2009/0325686 A1 | 12/2009 | Davis |
| 2010/0004058 A1 | 1/2010 | Acres |
| 2010/0016056 A1 | 1/2010 | Thomas et al. |
| 2010/0029373 A1 | 2/2010 | Graham et al. |
| 2010/0035674 A1 | 2/2010 | Slomiany |
| 2010/0035694 A1 | 2/2010 | Losica |
| 2010/0056247 A1 | 3/2010 | Nicely |
| 2010/0056260 A1 | 3/2010 | Fujimoto |
| 2010/0062836 A1 | 3/2010 | Young |
| 2010/0093420 A1 | 4/2010 | Wright |
| 2010/0093444 A1 | 4/2010 | Biggar et al. |
| 2010/0105454 A1 | 4/2010 | Weber |
| 2010/0120525 A1 | 5/2010 | Baerlocher et al. |
| 2010/0124983 A1 | 5/2010 | Gowin et al. |
| 2010/0137047 A1 | 6/2010 | Englman et al. |
| 2010/0174593 A1 | 7/2010 | Cao |
| 2010/0184509 A1 | 7/2010 | Sylla et al. |
| 2010/0203940 A1 | 8/2010 | Alderucci et al. |
| 2010/0210344 A1 | 8/2010 | Edidin et al. |
| 2010/0227672 A1 | 9/2010 | Amour |
| 2010/0227688 A1 | 9/2010 | Lee |
| 2010/0240436 A1 | 9/2010 | Wilson et al. |
| 2010/0304825 A1 | 12/2010 | Davis |
| 2010/0304839 A1 | 12/2010 | Johnson |
| 2010/0304842 A1 | 12/2010 | Friedman et al. |
| 2011/0009177 A1 | 1/2011 | Katz |
| 2011/0009178 A1* | 1/2011 | Gerson ............... G07F 17/32 463/17 |
| 2011/0045896 A1 | 2/2011 | Sak et al. |
| 2011/0077087 A1 | 3/2011 | Walker et al. |
| 2011/0082571 A1 | 4/2011 | Murdock et al. |
| 2011/0105206 A1 | 5/2011 | Rowe et al. |
| 2011/0107239 A1 | 5/2011 | Adoni |
| 2011/0109454 A1 | 5/2011 | McSheffrey |
| 2011/0111820 A1 | 5/2011 | Filipour |
| 2011/0111837 A1 | 5/2011 | Gagner |
| 2011/0111841 A1 | 5/2011 | Tessmer |
| 2011/0118011 A1 | 5/2011 | Filipour et al. |
| 2011/0201413 A1 | 8/2011 | Oberberger |
| 2011/0207523 A1 | 8/2011 | Filipour et al. |
| 2011/0212766 A1 | 9/2011 | Bowers |
| 2011/0212767 A1 | 9/2011 | Barclay |
| 2011/0218028 A1 | 9/2011 | Acres |
| 2011/0218035 A1* | 9/2011 | Thomas ............... G07F 17/32 463/25 |
| 2011/0230258 A1 | 9/2011 | Van Luchene |
| 2011/0230260 A1 | 9/2011 | Morrow et al. |
| 2011/0230267 A1 | 9/2011 | Van Luchene |
| 2011/0244944 A1 | 10/2011 | Baerlocher |
| 2011/0263312 A1 | 10/2011 | De Waal |
| 2011/0269522 A1 | 11/2011 | Nicely et al. |
| 2011/0275440 A1 | 11/2011 | Faktor |
| 2011/0287828 A1 | 11/2011 | Anderson et al. |
| 2011/0287841 A1 | 11/2011 | Watanabe |
| 2011/0312408 A1 | 12/2011 | Okuaki |
| 2011/0319169 A1 | 12/2011 | Lam |
| 2012/0004747 A1 | 1/2012 | Kelly |
| 2012/0009997 A1* | 1/2012 | Youm ............... A63F 13/795 463/42 |
| 2012/0028718 A1 | 2/2012 | Barclay et al. |
| 2012/0058814 A1 | 3/2012 | Lutnick |
| 2012/0077569 A1 | 3/2012 | Watkins |
| 2012/0108323 A1 | 5/2012 | Kelly |
| 2012/0135793 A1 | 5/2012 | Antonopoulos |
| 2012/0202587 A1 | 8/2012 | Allen |
| 2012/0302311 A1 | 11/2012 | Luciano |
| 2012/0322545 A1 | 12/2012 | Arnone et al. |
| 2013/0029760 A1 | 1/2013 | Wickett |
| 2013/0131848 A1 | 5/2013 | Arnone et al. |
| 2013/0190074 A1 | 7/2013 | Arnone et al. |
| 2013/0260869 A1 | 10/2013 | Basallo et al. |
| 2014/0087801 A1 | 3/2014 | Nicely et al. |
| 2014/0087808 A1 | 3/2014 | Basallo et al. |
| 2014/0087809 A1 | 3/2014 | Leupp et al. |
| 2014/0357350 A1 | 12/2014 | Weingardt et al. |

FOREIGN PATENT DOCUMENTS

| | | |
|---|---|---|
| JP | 2004097610 A | 4/2004 |
| JP | 2004166746 A | 6/2004 |
| JP | 2006254979 A | 9/2006 |
| JP | 2011217763 A | 11/2011 |
| WO | 9851384 A1 | 11/1998 |
| WO | 2010087090 A1 | 8/2010 |
| WO | 2011109454 | 9/2011 |
| WO | 2011109454 A1 | 9/2011 |
| WO | 2012139083 A1 | 10/2012 |
| WO | 2013059308 A1 | 4/2013 |

OTHER PUBLICATIONS

U.S. Appl. No. 14/598,151 Arnone, et al. filed Jan. 15, 2015.
U.S. Appl. No. 14/601,063 Arnone, et al. filed Jan. 20, 2015.
U.S. Appl. No. 14/601,108 Arnone, et al. filed Jan. 20, 2015.
U.S. Appl. No. 14/608,000 Arnone, et al. filed Jan. 28, 2015.
U.S. Appl. No. 14/608,087 Arnone, et al. filed Jan. 28, 2015.
U.S. Appl. No. 14/608,093 Arnone, et al. filed Jan. 28, 2015.
U.S. Appl. No. 14/610,897 Arnone, et al. filed Jan. 30, 2015.
U.S. Appl. No. 14/611,077 Arnone, et al. filed Jan. 30, 2015.
U.S. Appl. No. 14/604,629 Arnone, et al. filed Jan. 23, 2015.
U.S. Appl. No. 14/625,475 Arnone, et al. filed Feb. 18, 2015.
U.S. Appl. No. 14/617,852 Arnone, et al. filed Feb. 9, 2015.
U.S. Appl. No. 14/627,428 Arnone, et al. filed Feb. 20, 2015.
U.S. Appl. No. 14/642,427 Arnone, et al. filed Mar. 9, 2015.
U.S. Appl. No. 14/665,991 Arnone, et al. filed Mar. 23, 2015.
U.S. Appl. No. 14/666,010 Arnone, et al. filed Mar. 23, 2015.
U.S. Appl. No. 14/666,022 Arnone, et al. filed Mar. 23, 2015.
U.S. Appl. No. 14/642,623 Arnone, et al. filed Mar. 9, 2015.
U.S. Appl. No. 14/663,337 Arnone, et al. filed Mar. 19, 2015.

(56) References Cited

OTHER PUBLICATIONS

U.S. Appl. No. 14/666,284 Arnone, et al. filed Mar. 23, 2015.
U.S. Appl. No. 14/679,885 Arnone, et al. filed Apr. 6, 2015.
U.S. Appl. No. 14/685,378 Arnone, et al. filed Apr. 13, 2015.
U.S. Appl. No. 14/686,675 Arnone, et al. filed Apr. 14, 2015.
U.S. Appl. No. 14/686,678 Arnone, et al. filed Apr. 14, 2015.
U.S. Appl. No. 14/701,430 Arnone, et al. filed Apr. 30, 2015.
U.S. Appl. No. 14/703,721 Arnone, et al. filed May 4, 2015.
U.S. Appl. No. 14/708,138 Arnone, et al. filed May 8, 2015.
U.S. Appl. No. 14/708,141 Arnone, et al. filed May 8, 2015.
U.S. Appl. No. 14/708,160 Arnone, et al. filed May 8, 2015.
U.S. Appl. No. 14/708,161 Arnone, et al. filed May 8, 2015.
U.S. Appl. No. 14/708,162 Arnone, et al. filed May 8, 2015.
U.S. Appl. No. 14/710,483 Arnone, et al. filed May 12, 2015.
U.S. Appl. No. 14/714,084 Arnone, et al. filed May 15, 2015.
U.S. Appl. No. 14/715,463 Arnone, et al. filed May 18, 2015.
U.S. Appl. No. 14/720,620 Arnone, et al. filed May 22, 2015.
U.S. Appl. No. 14/720,624 Arnone, et al. filed May 22, 2015.
U.S. Appl. No. 14/720,626 Arnone, et al. filed May 22, 2015.
U.S. Appl. No. 14/727,726 Arnone, et al. filed Jun. 1, 2015.
U.S. Appl. No. 14/730,183 Arnone, et al. filed Jun. 3, 2015.
U.S. Appl. No. 14/731,321 Arnone, et al. filed Jun. 4, 2015.
U.S. Appl. No. 14/740,078 Arnone, et al. filed Jun. 15, 2015.
U.S. Appl. No. 14/742,517 Arnone, et al. filed Jun. 17, 2015.
U.S. Appl. No. 14/743,708 Arnone, et al. filed Jun. 18, 2015.
U.S. Appl. No. 14/746,731 Arnone, et al. filed Jun. 22, 2015.
U.S. Appl. No. 14/748,122 Arnone, et al. filed Jun. 23, 2015.
U.S. Appl. No. 14/788,581 Arnone, et al. filed Jun. 30, 2015.
U.S. Appl. No. 14/793,685 Arnone, et al. filed Jul. 7, 2015.
U.S. Appl. No. 14/793,704 Arnone, et al. filed Jul. 7, 2015.
U.S. Appl. No. 14/797,016 Arnone, et al. filed Jul. 10, 2015.
U.S. Appl. No. 14/799,481 Arnone, et al. filed Jul. 14, 2015.
WIPO/ISA International Search Report and Written Opinion, PCT/US12/60679, Mar. 8, 2013.
WIPO/IPEA, International Preliminary Report on Patentability, PCT/US12/60679, Jun. 13, 2014.
IP Australia, Patent Examination Report No. 1, Patent Application No. 2012326133, May 2, 2014.
itl.nist.gov, Extreme Studentized Deviate Test, [online], Sep. 2010, Internet<URL:http://www.itl.nist.gov/div898/software/dataplot/refman1/auxillar/esd.htm>, entire document, National Institute of Standards and Technology (NIST), U.S. Department of Commerce.
Changing the Virtual Self: Avatar Transformations in Popular Games; Barr et al., Victoria Univ., NZ, 2006.
Real-Time Multimodal Human—Avatar Interaction; Li et al., IEEE (Video Technology) vol. 18, No. 4, 2008.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 14/179,492 Arnone, et al., filed Feb. 12, 2014.
U.S. Appl. No. 14/181,190 Arnone, et al., filed Feb. 14, 2014.
U.S. Appl. No. 14/186,393 Arnone, et al., filed Feb. 21, 2014.
U.S. Appl. No. 14/188,587 Arnone, et al., filed Feb. 24, 2014.
U.S. Appl. No. 14/185,847 Arnone, et al., filed Feb. 20, 2014.
U.S. Appl. No. 14/203,459 Arnone, et al., filed Mar. 10, 2014.
U.S. Appl. No. 14/205,272 Arnone, et al., filed Mar. 11, 2014.
U.S. Appl. No. 14/815,764 Arnone, et al. filed Jul. 31, 2015.
U.S. Appl. No. 14/815,774 Arnone, et al. filed Jul. 31, 2015.
U.S. Appl. No. 14/817,032 Arnone, et al. filed Aug. 3, 2015.
U.S. Appl. No. 14/822,890 Arnone, et al. filed Aug. 10, 2015.
U.S. Appl. No. 14/823,951 Arnone, et al. filed Aug. 11, 2015.
U.S. Appl. No. 14/823,987 Arnone, et al. filed Aug. 11, 2015.
U.S. Appl. No. 14/825,056 Arnone, et al. filed Aug. 12, 2015.
U.S. Appl. No. 14/835,590 Arnone, et al. filed Aug. 25, 2015.
U.S. Appl. No. 14/836,902 Arnone, et al. filed Aug. 26, 2015.
U.S. Appl. No. 14/839,647 Arnone, et al. filed Aug. 28, 2015.
U.S. Appl. No. 14/842,684 Arnone, et al. filed Sep. 1, 2015.
U.S. Appl. No. 14/842,785 Arnone, et al. filed Sep. 1, 2015.
U.S. Appl. No. 14/854,021 Arnone, et al. filed Sep. 14, 2015.
U.S. Appl. No. 14/855,322 Arnone, et al. filed Sep. 15, 2015.
U.S. Appl. No. 14/859,065 Arnone, et al. filed Sep. 18, 2015.
U.S. Appl. No. 14/865,422 Arnone, et al. filed Sep. 25, 2015.
U.S. Appl. No. 14/867,809 Arnone, et al. filed Sep. 28, 2015.
U.S. Appl. No. 14/868,287 Arnone, et al. filed Sep. 28, 2015.
U.S. Appl. No. 14/868,364 Arnone, et al. filed Sep. 28, 2015.
U.S. Appl. No. 14/869,809 Arnone, et al. filed Sep. 29, 2015.
U.S. Appl. No. 14/869,819 Arnone, et al. filed Sep. 29, 2015.
U.S. Appl. No. 14/885,894 Arnone, et al. filed Oct. 16, 2015.
U.S. Appl. No. 14/919,665 Arnone, et al. filed Oct. 21, 2015.
U.S. Appl. No. 14/942,844 Arnone, et al. filed Nov. 16, 2015.
U.S. Appl. No. 14/942,883 Arnone, et al. filed Nov. 16, 2015.
U.S. Appl. No. 14/949,759 Arnone, et al. filed Nov. 23, 2015.
U.S. Appl. No. 14/952,758 Arnone, et al. filed Nov. 25, 2015.
U.S. Appl. No. 14/952,769 Arnone, et al. filed Nov. 25, 2015.
U.S. Appl. No. 14/954,922 Arnone, et al. filed Nov. 30, 2015.
U.S. Appl. No. 14/954,931 Arnone, et al. filed Nov. 30, 2015.
U.S. Appl. No. 14/955,000 Arnone, et al. filed Nov. 30, 2015.
U.S. Appl. No. 14/956,301 Arnone, et al. filed Dec. 1, 2015.
U.S. Appl. No. 14/965,231 Arnone, et al. filed Dec. 10, 2015.
U.S. Appl. No. 14/965,846 Arnone, et al. filed Dec. 10, 2015.
U.S. Appl. No. 14/981,640 Arnone, et al. filed Dec. 28, 2015.
U.S. Appl. No. 14/981,775 Arnone, et al. filed Dec. 28, 2015.
U.S. Appl. No. 14/984,943 Arnone, et al. filed Dec. 30, 2015.
U.S. Appl. No. 14/984,965 Arnone, et al. filed Dec. 30, 2015.
U.S. Appl. No. 14/984,978 Arnone, et al. filed Dec. 30, 2015.
U.S. Appl. No. 14/985,107 Arnone, et al. filed Dec. 30, 2015.
U.S. Appl. No. 14/995,151 Arnone, et al. filed Jan. 13, 2016.
U.S. Appl. No. 14/974,432 Arnone, et al. filed Dec. 18, 2015.
U.S. Appl. No. 14/997,413 Arnone, et al. filed Jan. 15, 2016.
U.S. Appl. No. 15/002,233 Arnone, et al. filed Jan. 20, 2016.
U.S. Appl. No. 15/005,944 Arnone, et al. filed Jan. 25, 2016.
U.S. Appl. No. 15/011,322 Arnone, et al. filed Jan. 29, 2016.
U.S. Appl. No. 15/051,535 Arnone, et al. filed Feb. 23, 2016.
U.S. Appl. No. 15/053,236 Arnone, et al. filed Feb. 25, 2016.
U.S. Appl. No. 15/057,095 Arnone, et al. filed Feb. 29, 2016.
U.S. Appl. No. 15/060,502 Arnone, et al. filed Mar. 3, 2016.

(56) References Cited

OTHER PUBLICATIONS

U.S. Appl. No. 15/063,365 Arnone, et al. filed Mar. 7, 2016.
U.S. Appl. No. 15/063,496 Arnone, et al. filed Mar. 7, 2016.
U.S. Appl. No. 15/073,602 Arnone, et al. filed Mar. 17, 2016.
U.S. Appl. No. 15/074,999 Arnone, et al. filed Mar. 18, 2016.
U.S. Appl. No. 15/077,574 Arnone, et al. filed Mar. 22, 2016.
U.S. Appl. No. 15/083,284 Arnone, et al. filed Mar. 28, 2016.
U.S. Appl. No. 15/091,395 Arnone, et al. filed Apr. 5, 2016.
U.S. Appl. No. 15/093,685 Arnone, et al. filed Apr. 7, 2016.
U.S. Appl. No. 14/205,303 Arnone, et al., filed Mar. 11, 2014.
U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 17, 2014.
U.S. Appl. No. 14/255,919 Arnone, et al. filed Apr. 17, 2014.
U.S. Appl. No. 14/263,988 Arnone, et al. filed Apr. 28, 2014.
U.S. Appl. No. 14/270,335 Arnone, et al. filed May 5, 2014.
U.S. Appl. No. 14/271,360 Arnone, et al. filed May 6, 2014.
U.S. Appl. No. 13/961,849 Arnone, et al. filed Aug. 7, 2013.
U.S. Appl. No. 13/746,850 Arnone, et al. filed Jan. 22, 2013.
U.S. Appl. No. 14/288,169 Arnone, et al. filed May 27, 2014.
U.S. Appl. No. 14/304,027 Arnone, et al. filed Jun. 13, 2014.
U.S. Appl. No. 14/306,187 Arnone, et al. filed Jun. 16, 2014.
U.S. Appl. No. 14/312,623 Arnone, et al. filed Jun. 23, 2014.
U.S. Appl. No. 14/330,249 Arnone, et al. filed Jul. 14, 2014.
U.S. Appl. No. 14/339,142 Arnone, et al. filed Jul. 23, 2014.
U.S. Appl. No. 14/458,206 Arnone, et al. filed Aug. 12, 2014.
U.S. Appl. No. 14/461,344 Arnone, et al. filed Aug. 15, 2014.
U.S. Appl. No. 14/462,516 Arnone, et al. filed Aug. 18, 2014.
U.S. Appl. No. 14/467,646 Meyerhofer, et al. filed Aug. 25, 2014.
U.S. Appl. No. 14/474,023 Arnone, et al. filed Aug. 29, 2014.
U.S. Appl. No. 14/486,895 Arnone, et al. filed Sep. 15, 2014.
U.S. Appl. No. 14/507,206 Arnone, et al. filed Oct. 6, 2014.
U.S. Appl. No. 14/521,338 Arnone, et al. filed Oct. 22, 2014.
U.S. Appl. No. 14/535,808 Arnone, et al. filed Nov. 7, 2014.
U.S. Appl. No. 14/535,816 Arnone, et al. filed Nov. 7, 2014.
U.S. Appl. No. 14/536,231 Arnone, et al. filed Nov. 7, 2014.
U.S. Appl. No. 14/536,280 Arnone, et al. filed Nov. 7, 2014.
U.S. Appl. No. 14/549,137 Arnone, et al. filed Nov. 20, 2014.
U.S. Appl. No. 14/550,802 Arnone, et al. filed Nov. 21, 2014.
U.S. Appl. No. 14/555,401 Arnone, et al. filed Nov. 26, 2014.
U.S. Appl. No. 14/559,840 Arnone, et al. filed Dec. 3, 2014.
U.S. Appl. No. 14/564,834 Arnone, et al. filed Dec. 9, 2014.
U.S. Appl. No. 14/570,746 Arnone, et al. filed Dec. 15, 2014.
U.S. Appl. No. 14/570,857 Arnone, et al. filed Dec. 15, 2014.
U.S. Appl. No. 14/586,626 Arnone, et al. filed Dec. 30, 2014.
U.S. Appl. No. 14/586,639 Arnone, et al. filed Dec. 30, 2014.
Japan Patent Office, Office Action, Japan Patent Application No. 2014-535998, Apr. 21, 2015, Japan.

\* cited by examiner

| N | 10% | 7.5% | 5% | 2.5% | 1% | N | 10% | 7.5% | 5% | 2.5% | 1% |
|---|---|---|---|---|---|---|---|---|---|---|---|
| 3 | 1.15 | 1.15 | 1.15 | 1.15 | 1.15 | 53 | | | 2.981 | 3.151 | |
| 4 | 1.42 | 1.44 | 1.46 | 1.48 | 1.49 | 54 | | | 2.988 | 3.158 | |
| 5 | 1.60 | 1.64 | 1.67 | 1.71 | 1.75 | 55 | | | 2.996 | 3.165 | |
| 6 | 1.73 | 1.77 | 1.82 | 1.89 | 1.94 | 56 | | | 3.002 | 3.172 | |
| 7 | 1.83 | 1.88 | 1.94 | 2.02 | 2.10 | 57 | | | 3.009 | 3.179 | |
| 8 | 1.91 | 1.96 | 2.03 | 2.13 | 2.22 | 58 | | | 3.016 | 3.186 | |
| 9 | 1.98 | 2.04 | 2.11 | 2.21 | 2.32 | 59 | | | 3.023 | 3.193 | |
| 10 | 2.03 | 2.10 | 2.18 | 2.29 | 2.41 | 60 | | | 3.030 | 3.200 | |
| 11 | 2.09 | 2.14 | 2.23 | 2.36 | 2.48 | 61 | | | 3.036 | 3.206 | |
| 12 | 2.13 | 2.20 | 2.29 | 2.41 | 2.55 | 62 | | | 3.042 | 3.212 | |
| 13 | 2.17 | 2.24 | 2.33 | 2.46 | 2.61 | 63 | | | 3.048 | 3.218 | |
| 14 | 2.21 | 2.28 | 2.37 | 2.51 | 2.66 | 64 | | | 3.054 | 3.224 | |
| 15 | 2.25 | 2.32 | 2.41 | 2.55 | 2.71 | 65 | | | 3.060 | 3.230 | |
| 16 | 2.28 | 2.35 | 2.44 | 2.59 | 2.75 | 66 | | | 3.066 | 3.236 | |
| 17 | 2.31 | 2.38 | 2.47 | 2.62 | 2.79 | 67 | | | 3.072 | 3.242 | |
| 18 | 2.34 | 2.41 | 2.50 | 2.65 | 2.82 | 68 | | | 3.078 | 3.248 | |
| 19 | 2.36 | 2.44 | 2.53 | 2.68 | 2.85 | 69 | | | 3.084 | 3.254 | |
| 20 | 2.39 | 2.46 | 2.56 | 2.71 | 2.88 | 70 | | | 3.090 | 3.260 | |
| 21 | | | 2.58 | 2.73 | 2.91 | 71 | | | 3.095 | 3.265 | |
| 22 | | | 2.60 | 2.76 | 2.94 | 72 | | | 3.100 | 3.270 | |
| 23 | | | 2.62 | 2.78 | 2.96 | 73 | | | 3.105 | 3.275 | |
| 24 | | | 2.64 | 2.80 | 2.99 | 74 | | | 3.110 | 3.280 | |
| 25 | | | 2.66 | 2.82 | 3.01 | 75 | | | 3.115 | 3.285 | |
| 26 | | | 2.680 | 2.840 | | 76 | | | 3.120 | 3.290 | |
| 27 | | | 2.700 | 2.860 | | 77 | | | 3.125 | 3.295 | |
| 28 | | | 2.720 | 2.880 | | 78 | | | 3.130 | 3.300 | |
| 29 | | | 2.730 | 2.900 | | 79 | | | 3.135 | 3.305 | |
| 30 | | | 2.750 | 2.910 | | 80 | | | 3.140 | 3.310 | |
| 31 | | | 2.760 | 2.930 | | 81 | | | 3.144 | 3.314 | |
| 32 | | | 2.780 | 2.950 | | 82 | | | 3.148 | 3.318 | |
| 33 | | | 2.790 | 2.960 | | 83 | | | 3.152 | 3.322 | |
| 34 | | | 2.810 | 2.970 | | 84 | | | 3.156 | 3.326 | |
| 35 | | | 2.820 | 2.980 | | 85 | | | 3.160 | 3.330 | |
| 36 | | | 2.830 | 2.990 | | 86 | | | 3.164 | 3.334 | |
| 37 | | | 2.840 | 3.004 | | 87 | | | 3.168 | 3.338 | |
| 38 | | | 2.850 | 3.016 | | 88 | | | 3.172 | 3.342 | |
| 39 | | | 2.860 | 3.028 | | 89 | | | 3.176 | 3.346 | |
| 40 | | | 2.870 | 3.040 | | 90 | | | 3.180 | 3.350 | |
| 41 | | | 2.880 | 3.050 | | 91 | | | 3.183 | 3.353 | |
| 42 | | | 2.890 | 3.060 | | 92 | | | 3.186 | 3.356 | |
| 43 | | | 2.900 | 3.070 | | 93 | | | 3.189 | 3.359 | |
| 44 | | | 2.910 | 3.080 | | 94 | | | 3.192 | 3.362 | |
| 45 | | | 2.920 | 3.090 | | 95 | | | 3.195 | 3.365 | |
| 46 | | | 2.928 | 3.098 | | 96 | | | 3.198 | 3.368 | |
| 47 | | | 2.936 | 3.106 | | 97 | | | 3.201 | 3.371 | |
| 48 | | | 2.944 | 3.114 | | 98 | | | 3.204 | 3.374 | |
| 49 | | | 2.952 | 3.122 | | 99 | | | 3.207 | 3.377 | |
| 50 | | | 2.967 | 3.137 | | 100 | | | 3.210 | 3.380 | |
| 52 | | | 2.974 | 3.144 | | | | | | | |

*FIG. 3B*

ANTI-SANDBAGGING IN HEAD-TO-HEAD GAMING FOR ENRICHED GAME PLAY ENVIRONMENT

CROSS REFERENCE TO RELATED APPLICATIONS

This application is a continuation of U.S. patent application Ser. No. 14/270,335 filed on May 5, 2014, which is a continuation of U.S. patent application Ser. No. 13/917,529, filed on Jun. 13, 2013 and issued May 6, 2014 as U.S. Pat. No. 8,715,068, which is a continuation of Patent Cooperation Treaty Application No. PCT/US12/60679, filed Oct. 17, 2012, and claims the benefit of U.S. Provisional Application Nos. 61/627,769, filed Oct. 17, 2011, 61/627,737 filed Oct. 17, 2011 and 61/627,749, filed Oct. 17, 2011 and is related to PCT patent application PCT/US11/26768, filed Mar. 1, 2011, U.S. Provisional Patent Application 61/459,131, filed Dec. 6, 2010, U.S. Provisional Patent Application 61/460,362, filed Dec. 31, 2010, U.S. Provisional Patent Application 61/516,693, filed Apr. 6, 2011, U.S. Provisional Patent Application entitled Enriched Table Top Game Play Environment (Single Or Multi-Player) For Casino Applications filed Sep. 30, 2011, the content of each of which is hereby incorporated by reference in its entirety as if stated in full herein.

FIELD OF THE INVENTION

Embodiments of the present invention are generally related to gaming and more specifically to an entertainment game played among players with various skill levels in an anti-sandbagging hybrid game that includes both a gambling game and an entertainment game.

BACKGROUND

The gaming machine manufacturing industry has traditionally developed gaming machines with a gambling game. A gambling game is typically a game of chance, which is a game where the outcome of the game is generally dependent solely on chance (such as a slot machine). A game of chance can be contrasted with a game of skill where the outcome of the game may depend upon a player's skill with the game. Gambling games are typically not as interactive and do not include graphics as sophisticated as an entertainment game, which is a game of skill such as a video game.

SUMMARY OF THE INVENTION

Systems and methods in accordance with embodiments of the invention operate an anti-sandbagging hybrid game. One embodiment includes an anti-sandbagging hybrid game, including one or more processors, memory coupled to the one or more processors, the memory storing processor-executable instructions that when executed by the one or more processors, cause the one or more processors to execute a process of: executing a gambling game comprising a real world engine constructed to provide a randomly generated real world credit payout for a bet of an amount of real world credits in the gambling game, executing an entertainment software engine constructed to provide an entertainment game of skill providing a game world credit outcome upon a player's execution of the entertainment game of skill, executing a game world engine constructed to manage the entertainment software engine and communicate a gameplay gambling event occurrence based upon the player's execution of the entertainment game of skill, the gameplay gambling event occurrence triggering the bet of the amount of real world credits in the gambling game and generation of the randomly generated real world credit payout for the gambling game for the bet of the amount of real world credits, to the gambling game, and executing an anti-sandbagging module constructed to receive player performance measurements for the player from the game world engine, assign an anti-sandbagging provision to the player based at least in part upon the performance measurements for the player from the game world engine by determining if the player's performance measurements are a significant deviation from expected player performance measurements, wherein the anti-sandbagging provision is a limitation on the bet of the amount of real world credits, and send information concerning the assigned anti-sandbagging provision to the game world engine that configures the game world engine to implement the assigned anti-sandbagging provision within the anti-sandbagging hybrid game.

In some embodiments, the player performance measurements include the game world credit outcome of the player's execution of the entertainment game of skill and the amount of real world credits utilized by the player in the wager of the amount of real world credits as triggered in the gambling game.

In some embodiments, the anti-sandbagging provision is assigned to the player based at least in part upon a relationship between the game world credit outcome of the player's execution of the entertainment game of skill and the amount of real world credits utilized by the player in the real world credit wager as triggered in the gambling game included in the performance measurements for the player from the game world engine.

In many embodiments, the limitation on the bet of the amount of real world credits is a limit on the value of bets that can be placed.

In several embodiments, the limitation on the bet of the amount of real world credits is a limit on the volume of bets that can be placed.

In many embodiments, the limit on the volume of bets that can be placed is a limit on a number of bets that can be placed.

In numerous embodiments, the limit on the volume of bets that can be placed is a limit on an aggregate value of bets placed.

In several embodiments, the limit on the volume of bets that can be placed is a limit on an aggregate value of bets won.

Another additional embodiment includes a method of operating an anti-sandbagging hybrid game that includes an entertainment game constructed to provide outcomes upon a player's skillful execution of the entertainment game, the method including: receiving player performance measurements for at least one player from a game world engine using an anti-sandbagging module, where the game world engine is constructed to communicate gameplay gambling event occurrences based upon a player's skillful execution of the entertainment game that trigger the randomly generated payout for the gambling game to a gambling game including a real world engine constructed to provide a randomly generated payout for the gambling game; assigning an anti-sandbagging provision to the at least one player based at least in part upon the performance measurements for the at least one player from the game world engine using the anti-sandbagging module; and sending information concerning the anti-sandbagging provision to the game world engine using the anti-sandbagging module that configures the game world engine to implement the assigned anti-sandbagging provision within the anti-sandbagging hybrid game using the anti-sandbagging module.

In a still yet further embodiment, the assigning the anti-sandbagging provision to the at least one player based at least in part upon the performance measurements for the at least one player from the game world engine includes determining that a player's performance measurements are a significant deviation from expected player performance measurements.

In a still further additional embodiment, the determining that a player's performance measurements are a significant deviation from expected player performance measurements utilizes an outlier test.

In still another additional embodiment, the outlier test is the Grubb's outlier test.

In a yet further embodiment again, the outlier test is the Dixon Q-test.

In yet another embodiment again, the anti-sandbagging module is constructed to adjust a player's anti-sandbagging provision upon determining that a player's performance measurements are a significant deviation from expected player performance measurements.

A yet further additional embodiment includes a machine readable medium containing processor instructions, where execution of the instructions by a processor causes the processor to perform a process including: receiving player performance measurements for at least one player from a game world engine that is constructed to communicate gameplay gambling event occurrences based upon a player's skillful execution of an entertainment game that trigger a randomly generated payout for a gambling game to a gambling game; assigning an anti-sandbagging provision to the at least one player based at least in part upon the performance measurements for the at least one player from the game world engine using the anti-sandbagging module; and sending information concerning the anti-sandbagging provision to the game world engine using the anti-sandbagging module that configures the game world engine to implement the assigned anti-sandbagging provision within the anti-sandbagging hybrid game using the anti-sandbagging module.

BRIEF DESCRIPTION OF THE DRAWINGS

FIG. 10 is a system diagram that illustrates a network distributed anti-sandbagging hybrid game in accordance with an embodiment of the invention.

FIG. 3B is a lookup table that can be used to determine the probability that rejection of a player's performance at an anti-sandbagging hybrid game as being inconsistent with the player's actual ability would be improper in accordance with an embodiment of the invention.

DETAILED DESCRIPTION

Figure 1A:
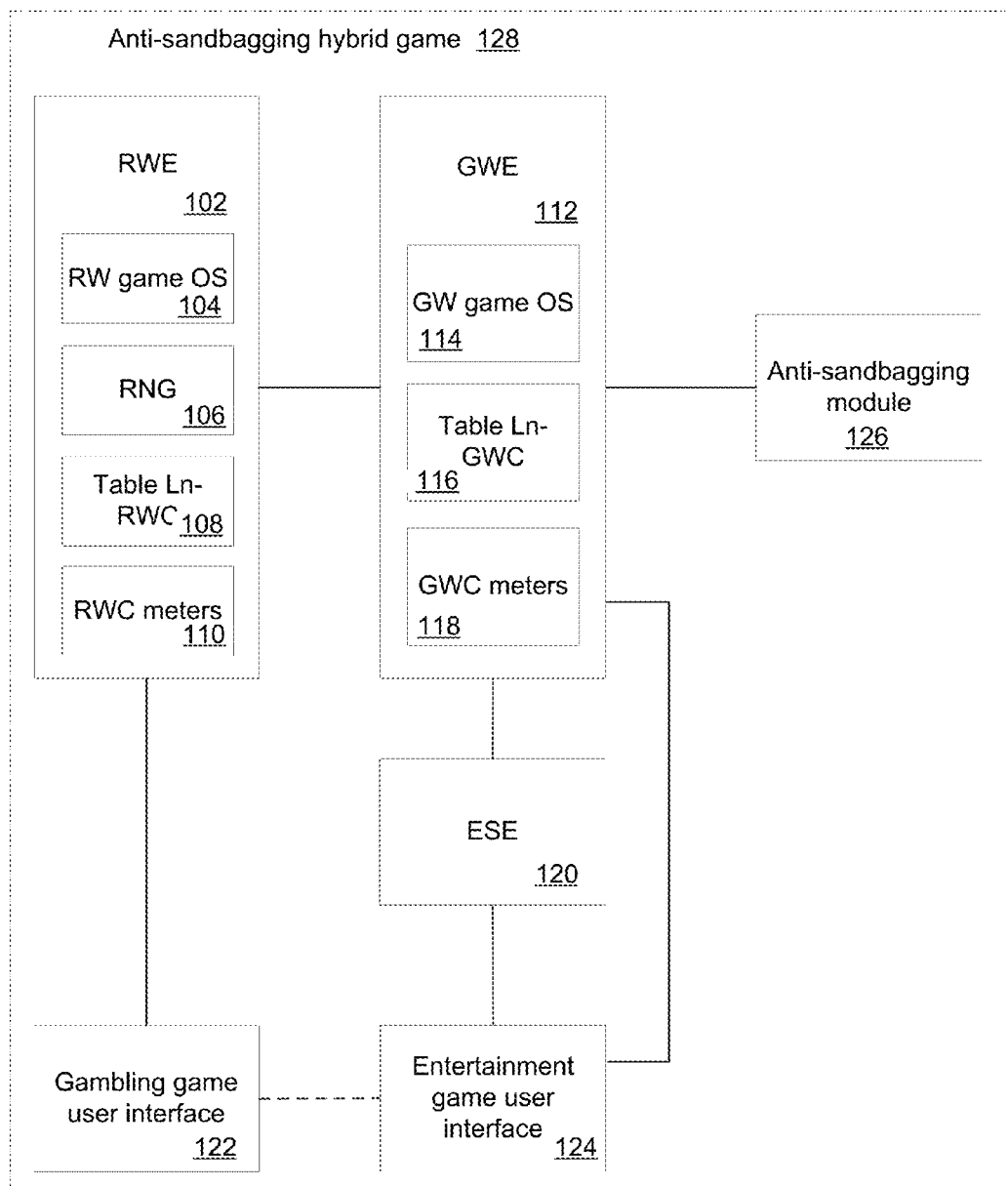
FIG. 1A illustrates an anti-sandbagging hybrid game in accordance with an embodiment of the invention.

Turning now to the drawings, systems and methods for operation of an anti-sandbagging hybrid game are illustrated. In several embodiments, an anti-sandbagging hybrid game is a form of a hybrid game that integrates both a gambling game that includes a real world engine (RWE) which manages the gambling game, as well as an entertainment game that includes a game world engine (GWE) which manages the entertainment portion of a game, and an entertainment software engine (ESE) which executes the game for user entertainment. In certain embodiments, the anti-sandbagging hybrid game also includes a user interface associated with either or both the gambling game and the entertainment game.

In operation of an anti-sandbagging hybrid game, a player acts upon various types of elements of the entertainment game in a game world environment. Upon acting on some of these elements, a wager is triggered in the gambling game. In playing the entertainment game, using the elements, a player can consume and accrue game world credits (GWC) within the entertainment game. These credits can be in the form of game world objects, experience points, points, etc. Wagers are made in the gambling game using real world credits (RC or RWC). The real world credits can be credits in an actual currency, or may be credits in a virtual currency. Gambling outcomes from the gambling game may cause consumption, loss or accrual of real or virtual credits. In addition, gambling outcomes in the gambling game may influence elements in the entertainment game such as by restoring a consumed element, causing the loss of an element, restoration or placement of a fixed element, etc. Example elements include enabling elements (EE) which are elements that enable a player's play of the entertainment game and may be consumed during play and may also be replenished during play within the entertainment game. Other types of elements include actionable elements (AE) which are elements that are acted upon and may not be restorable during normal play of the entertainment game.

Various hybrid games are discussed in Patent Cooperation Treaty Application No. PCT/US11/26768, filed Mar. 1, 2011, entitled "ENRICHED GAME PLAY ENVIRONMENT (SINGLE and/or MULTI-PLAYER) FOR CASINO APPLICATIONS" and Patent Cooperation Treaty Application No. PCT/US11/63587, filed Dec. 6, 2011, entitled "ENHANCED SLOT-MACHINE FOR CASINO APPLICATIONS" each disclosure of which is hereby incorporated by reference in its entirety.

In many embodiments, an anti-sandbagging hybrid game utilizes an anti-sandbagging so that entertainment game play of the anti-sandbagging hybrid game is fair to the player(s) of the anti-sandbagging hybrid game irrespective of player skill level at the entertainment game. The anti-sandbagging module can employ handicaps to entertainment game play to ensure that both less and more skilled players can derive a normal level of pleasure and progress in entertainment game play and that there is a fair amount of competition between players of different skill levels in head to head play of the entertainment game. In certain embodiments the anti-sandbagging module only monitors entertainment game play to ensure fair game play of the anti-sandbagging hybrid game irrespective of player skill level at the entertainment game. In particular embodiments the anti-sandbagging module monitors the entire anti-sandbagging hybrid game, such as by factoring in random outcomes in the entertainment game due to payouts from the gambling game, to ensure fair play of the entertainment game irrespective of player skill level at the anti-sandbagging hybrid game.

In several embodiments, an anti-sandbagging module ensures fair game play irrespective of player skill level by assigning rankings to each player of the anti-sandbagging hybrid game based upon player performance measurements and by assigning handicaps based upon each player's rankings. In certain embodiments, player performance measurements are based upon a player's performance results from head to head play against opponents. In particular embodiments, player performance measurements are experience points for game attributes from which a player's ranking can be derived.

In numerous embodiments, an anti-sandbagging module monitors a player's performance during entertainment game play after an initial player ranking is assigned to handicap the player if the player has significantly deviated from the player's expected performance at the entertainment game. In certain embodiments, statistical analysis using a player's current performance measurements and historical performance measurements are used determine if the player has significantly deviated from expected performance at the entertainment game. Anti-sandbagging hybrid games in accordance with embodiments of the invention are discussed further below.

Anti-Sandbagging Hybrid Games

In many embodiments, an anti-sandbagging hybrid game integrates high levels of entertainment content with a game of skill (entertainment game), a gambling experience with a game of chance (gambling game), and a fair game play experience irrespective of player skill level with an anti-sandbagging module. An anti-sandbagging hybrid game provides for a random outcome independent of player skill while providing that the user's gaming experience (as measured by obstacles/challenges encountered, time of play and other factors) is shaped by the player's skill. An anti-sandbagging hybrid game in accordance with an embodiment of the invention is illustrated in FIG. 1A. The anti-sandbagging hybrid game 128 includes a RWE 102, GWE 112, ESE 120, gambling game user interface 122, entertainment game user interface 124 and an anti-sandbagging module 126. The two user interfaces may be part of the same user interface but are separate in the illustrated embodiment. The RWE 102 is connected with the GWE 112 and the gambling game user interface 122. The ESE 120 is connected with the GWE 112 and the entertainment game user interface 124. The GWE 112 is connected also with the entertainment game user interface 124. The anti-sandbagging module 126 is connected with the GWE 112.

In several embodiments, the RWE 102 is the fundamental operating system for the gambling game of the anti-sandbagging hybrid game 128 and controls and operates the gambling game. The operation of a gambling game is enabled by money, such as real funds, accretes and declinates real gambling credits based on random gambling outcome, and whose gambling proposition is typically regulated by gaming control bodies. In many embodiments, the RWE includes a RW operating system (OS) 104, random number generator (RNG) 106, level "n" real-world credit pay tables (Table Ln-RWC) 108, RWC meters 110 and other software constructs that enable a game of chance to offer a fair and transparent gambling proposition, and to contain the auditable systems and functions that can enable the game to obtain gaming regulatory body approval.

A random number generator (RNG) 106 includes software and/or hardware algorithm and/or processes, which are used to generate random outcomes. A level "n" real-world credit pay table (Table Ln-RWC) 108 is a table that can be used in conjunction with a random number generator (RNG) 106 to dictate the real world credits (RWC) earned as a function of game play and is analogous to the pay tables used in a conventional slot machine. Table Ln-RWC payouts are independent of player skill. There may be one or a plurality of Table Ln-RWC pay tables 108 contained in a gambling game, the selection of which may be determined by factors including (but not limited to) game progress a player has earned, and/or bonus rounds which a player may be eligible for. Real world credits (RWC) are credits analogous to slot machine game credits, which are entered into a gambling game by the user, either in the form of money such as hard currency or electronic funds. RWCs can be decremented or augmented based on the outcome of a random number generator according to the Table Ln-RWC real world credits pay table 108, independent of player skill. In certain embodiments, an amount of RWC can be required to enter higher ESE game levels. RWC can be carried forward to higher game levels or paid out if a cash out is opted for by a player. The amount of RWC required to enter a specific level of the game "level n" need not be the same for each level.

In many embodiments, the GWE 112 manages the overall anti-sandbagging hybrid game operation, with the RWE 102 and the ESE 120 effectively being support units to the GWE 112. In several embodiments, the GWE 112 contains mechanical, electronic and software system for an entertainment game. The GWE 112 includes a GW game operating system (OS) 114 that provides control of the entertainment game. The GWE additionally contains a level "n" game world credit pay table (Table Ln-GWC) 116 from where to take input from this table to affect the play of the entertainment game. The GWE 112 can further couple to the RWE 102 to determine the amount of RWC available on the game and other metrics of wagering on the gambling game (and potentially affect the amount of RWC in play on the RWE). The GWE additionally contains various audit logs and activity meters (such as the GWC meter) 118. The GWE 112 can also couple to a centralized server for exchanging various data related to the player and their activities on the game. The GWE 112 furthermore couples to the ESE 120.

In many embodiments, a level "n" game world credit pay table (Table Ln-GWC) 116 dictates the GWC earned as a function of player skill in the nth level of the game. The payouts governed by this table are dependent upon player skill and game play at large and may or may not be coupled to a random number generator. In several embodiments, game world credits (GWC) are player points earned or depleted as a function of player skill, i.e. as a function of player performance in the context of the game. GWC is analogous to the "score" in a typical video game. Each entertainment game has one or more scoring criterion, embedded within the Table Ln-GWC 116 that reflects player performance against the goal(s) of the game. GWC can be carried forward from one level of game play to another, and ultimately paid out in various manners such as directly in cash, or indirectly such as earning entrance into a sweepstakes drawing, or earning participation in, or victory in, a tournament with prizes. GWC may be stored on a player tracking card or in a network-based player tracking system, where the GWC is attributed to a specific player.

In certain embodiments, the operation of the GWE does not affect the RWE's gambling operation except for player choice parameters that are allowable in slot machines today including but not limited to the wager amount, how fast the player wants to play (by pressing a button or pulling the slot's handle) and/or agreement to wager into a bonus round. In this sense, the RWE 102 provides a fair and transparent, non-skill based gambling proposition co-processor to the GWE 112. In the illustrated embodiment, the communication link shown between the GWE 112 and the RWE 102 allows the GWE 112 to obtain information from the RWE 102 as to the amount of RWC available in the gambling game. The communication link can also convey a necessary status operation of the RWE (such as on-line or tilt). The communication link can further communicate the various gambling control factors which the RWE 102 uses as input, such as the number of RWC consumed per game or the player's election to enter a jackpot round. In FIG. 1A, the GWE 112 is also shown as connecting to the player's user interface directly, as this may be necessary to communicate certain entertainment game club points, player status, control the selection of choices and messages which a player may find useful in order to adjust their entertainment game experience or understand their gambling status in the RWE 102.

In various embodiments, the ESE 120 manages and controls the visual, audio, and player control for the entertainment game. In certain embodiments, the ESE 120 accepts input from a player through a set of hand controls, and/or head, gesture, and/or eye tracking systems and outputs video, audio and/or other sensory output to a user interface. In many embodiments, the ESE 120 can exchange data with and accept control information from the GWE 112. In several embodiments an ESE 120 can be implement using a personal computer (PC), a Sony PlayStation® (a video game console developed by Sony Computer Entertainment of Tokyo Japan), or Microsoft Xbox® (a video game console developed by Microsoft Corporation of Redmond, Wash.) running a specific entertainment game software program. In numerous embodiments, an ESE can be an electromechanical game system of an anti-sandbagging hybrid game that is an electromechanical hybrid game. An electromechanical hybrid game executes an electromechanical game for player entertainment. The electromechanical game can be any game that utilizes both mechanical and electrical components, where the game operates as a combination of mechanical motions performed by at least one player or the electromechanical game itself. Various electromechanical hybrid games are discussed in Patent Cooperation Treaty Application No. PCT/US12/58156, filed Sep. 29, 2012, the contents of which are hereby incorporated by reference in their entirety.

The ESE 120 operates mostly independently from the GWE 112, except that via the interface, the GWE 112 may send certain GW game control parameters and elements to the ESE 120 to affect its play, such as (but not limited to) what level of character to be using, changing the difficulty level of the game, changing the type of gun or car in use, and/or requesting portions to become available or to be found by the character. These game control parameters and elements may be based on a gambling outcome of a gambling game that was triggered by an element in the entertainment game being acted upon by the player. The ESE 120 can accept this input from the GWE 112, make adjustments, and continue the play action all the while running seamlessly from the player's perspective. The ESE's operation is mostly skill based, except for where the ESE's algorithm may inject complexities into the game by chance in its normal operation to create unpredictability in the entertainment game. Utilizing this interface, the ESE 120 may also communicate player choices made in the game to the GWE 112, such as but not limited to selection of a different gun, and/or the player picking up a special portion in the GW environment. The GWE's job in this architecture, being interfaced thusly to the ESE 120, is to allow the transparent coupling of entertainment software to a fair and transparent random chance gambling game, providing a seamless perspective to the player that they are playing a typical popular entertainment game (which is skill based). In certain embodiments, the ESE 120 can be used to enable a wide range of games including but not limited to popular titles from arcade and home video games, such as but not limited to Gears of War (a third person shooter game developed by Epic Games of Cary, N.C.), Time Crisis (a shooter arcade game developed by Namco Ltd of Tokyo, Japan), or Madden Football (an American football video game developed by EA Tiburon of Maitland, Fla.). Providers of such software can provide the previously described interface by which the GWE 120 can request amendments to the operation of the ESE software in order to provide seamless and sensible operation as both a gambling game and an entertainment game.

In several embodiments, the RWE 102 can accept a trigger to run a gambling game in response to actions taken by the player in the entertainment game as conveyed by the ESE 120 to the GWE 112, or as triggered by the GWE 112 based on its algorithms, background to the overall game from the player's perspective, but can provide information to the GWE 112 to expose the player to certain aspects of the gambling game, such as (but not limited to) odds, amount of RWC in play, and amount of RWC available. The RWE 102 can accept modifications in the amount of RWC wagered on each individual gambling try, or the number of games per minute the RWE 102 can execute, entrance into a bonus round, and other factors, all the while these factors can take a different form than that of a typical slot machine. An example of a varying wager amount that the player can choose might be that they have decided to play with a more powerful character in the game, a more powerful gun, or a better car. These choices can increase or decrease the amount wagered per individual gambling game, in the same manner that a standard slot machine player may decide to wager more or less credits for each pull of the handle. In several embodiments, the RWE 102 can communicate a number of factors back and forth to the GWE 112, via an interface, such increase/decrease in wager being a function of the player's decision making as to their operational profile in the entertainment game (i.e. power of the character, gun selection, car choice, etc.). In this manner, the player is always in control of the per game wager amount, with the choice mapping to some parameter or component that is applicable to the entertainment game experience of the hybrid game. In a particular embodiment, the RWE 102 operation can be a game of chance running every 10 seconds where the amount wagered is communicated from the GWE 112 as a function of choices the player makes in the operation profile in the entertainment game such as those cited above.

In many embodiments, an anti-sandbagging hybrid game integrates a video game style gambling machine, where the gambling game (i.e. RWE 102 and RWC) is not player skill based, while at the same time allows players to use their skills to earn club points which a casino operator can translate to rewards, tournament opportunities and prizes for the players. The actual exchange of monetary funds earned or lost directly from gambling against a game of chance, such as a slot machine, is preserved. At the same time a rich environment of rewards to stimulate "garners" can be established with the entertainment game. In several embodiments, the anti-sandbagging hybrid game can leverage very popular titles with "garners" and provides a sea change environment for casinos to attract players with games that are more akin to the type of entertainment which a younger generation desires. In various embodiments, players can use their skill towards building and banking GWC which in turn can be used to win tournaments and various prizes as a function of their "gamer" prowess. Numerous embodiments minimize the underlying changes needed to the aforementioned entertainment software for the hybrid game to operate within an entertainment game construct, thus making a plethora of complex game titles and environments, rapid and inexpensive to deploy in a gambling environment.

In certain embodiments, anti-sandbagging hybrid games also allow players to gain entry into subsequent competitions through the accumulation of game world credits (GWC) that accrue as a function of the user's demonstrated skill at the game. These competitions can pit individual players or groups of players against one another and/or against the casino to win prizes based upon a combination of chance and skill. These competitions may be either asynchronous events, whereby players participate at a time and/or place of their choosing, or they may be synchronized events, whereby players participate at a specific time and/or venue.

In many embodiments, one or more players engage in playing an entertainment game, resident in the ESE, the outcomes of which are dependent at least in part on skill. The anti-sandbagging hybrid game can include an entertainment game that includes head-to-head play between a single player and the computer, between two or more players against one another, or multiple players playing against the computer and/or each other, as well as the process by which players bet on the outcome of the entertainment game. The entertainment game can also be a game where the player is not playing against the computer or any other player, such as in games where the player is effectively playing against himself or herself (such as but not limited to solitaire and babette).

In many embodiments, if an entertainment game includes a version of Madden Football™ for example, a player can bet on whether or not the player is going to beat the computer, or if the player is playing against another player, that other player. These bets can be made, for example, on the final outcome of the game, and/or the state of the game along various intermediary points (such as but not limited to the score at the end of the 1st quarter) and/or on various measures associated with the game (such as but not limited to the total offensive yards, number of turnovers, or number of sacks). Players can bet against one another, or engage the computer in a head to head competition in the context of their skill level in the entertainment game in question. As such, players can have a handicap associated with their player profile that describes their skill (which can be their "professed skill" in certain embodiments), and which is used by a GWE (such as a local GWE or a GWE that receives services from remote servers) to offer appropriate bets around the final and/or intermediate outcomes of the entertainment game, and/or to condition game play as a function of player skill, and/or to select players across one or more anti-sandbagging hybrid games to participate in head to head games and/or tournaments.

In such a scenario, assurances should be made to ensure that the player is not sandbagging, i.e. that the player has not previously performed below his actual skill level, in order to play in a future game with a lower skill rating and consequently have a better chance to win. For example, a highly skilled Scrabble® player might play ten games of Scrabble and intentionally garner mediocre scores so as to be handicapped as a "beginner". This highly skilled player could then enter a "beginner" tournament, making a number of bets regarding the progress or outcome of the game, and in such tournament play at his true level of skill (i.e. "expert"), thereby giving him a substantial advantage over the true beginner players in the tournament. Such a player would be guilty of sandbagging.

Various embodiments include measures to prevent sandbagging in the context of hybrid games where the outcome of the game is in part or in whole determined by player skill and where betting as a function of skill-related performance and/or outcomes is permitted. Each of these embodiments can be used singularly or in conjunction with one or more of the other embodiments. Each of the embodiments is configured by the casino through the GWE (via an "anti-sandbagging module") or a master anti-sandbagging server to which the relevant GWEs are subscribed. The GWE uses the anti-sandbagging software module to evaluate player performance against the player's professed skill level as represented by his handicap. It does this by comparing the player's performance during game play against the player's historical performance and/or the historical performance of players with similar handicaps. To the extent that the player's current performance exceeds his historical performance and/or the historical performance of his peers (vis-à-vis their handicaps) in a statistically meaningful way, the player is deemed to be sandbagging. In that event one or more of the below embodiments can be brought into force, having been parameterized previously by the casino as regards the severity with which the player's performance and/or status is to be affected.

In numerous embodiments, an anti-sandbagging module receives player performance measurements from the anti-sandbagging hybrid game and determines an appropriate skill level or ranking for the player based on those player performance metrics and initiates anti-sandbagging provisions as may be appropriate. Performance measurement data may include, but is not limited to, an outcome of the player playing the entertainment game, such as an expenditure, gain, loss or accumulation of GWC, player's experience points or the like (either as a rate or a total accumulation), a player's use of entertainment game resources such as EEs or AEs (either as a rate or an absolute amount) during one or more playing sessions, or a player's use, loss or accumulation of wagered credit resources, either real or virtual, (either as a rate or an absolute amount), etc. In addition, various other metrics may be derived from the performance measurement data, such as by determining a relationship, such as a ratio, between an outcome of the player's play of the entertainment game and a resource utilized by a player when playing the entertainment game. For example, determining the relationship of a rate of accumulation of GWC or other types of experience points by a rate of use of EE, credit, AE, etc. Other derivations may be determining a relationship between an accumulation of a GWC or other measure of experience by a total amount of a resource used, such as EEs, AEs, credits, etc.

Although various components of anti-sandbagging hybrid games are discussed above, anti-sandbagging hybrid games can be configured with any component appropriate to the requirements of a specific application in accordance with embodiments of the invention. Network connected anti-sandbagging hybrid games are discussed further below.

Network Connected Anti-Sandbagging Hybrid Games

Figure 1B:
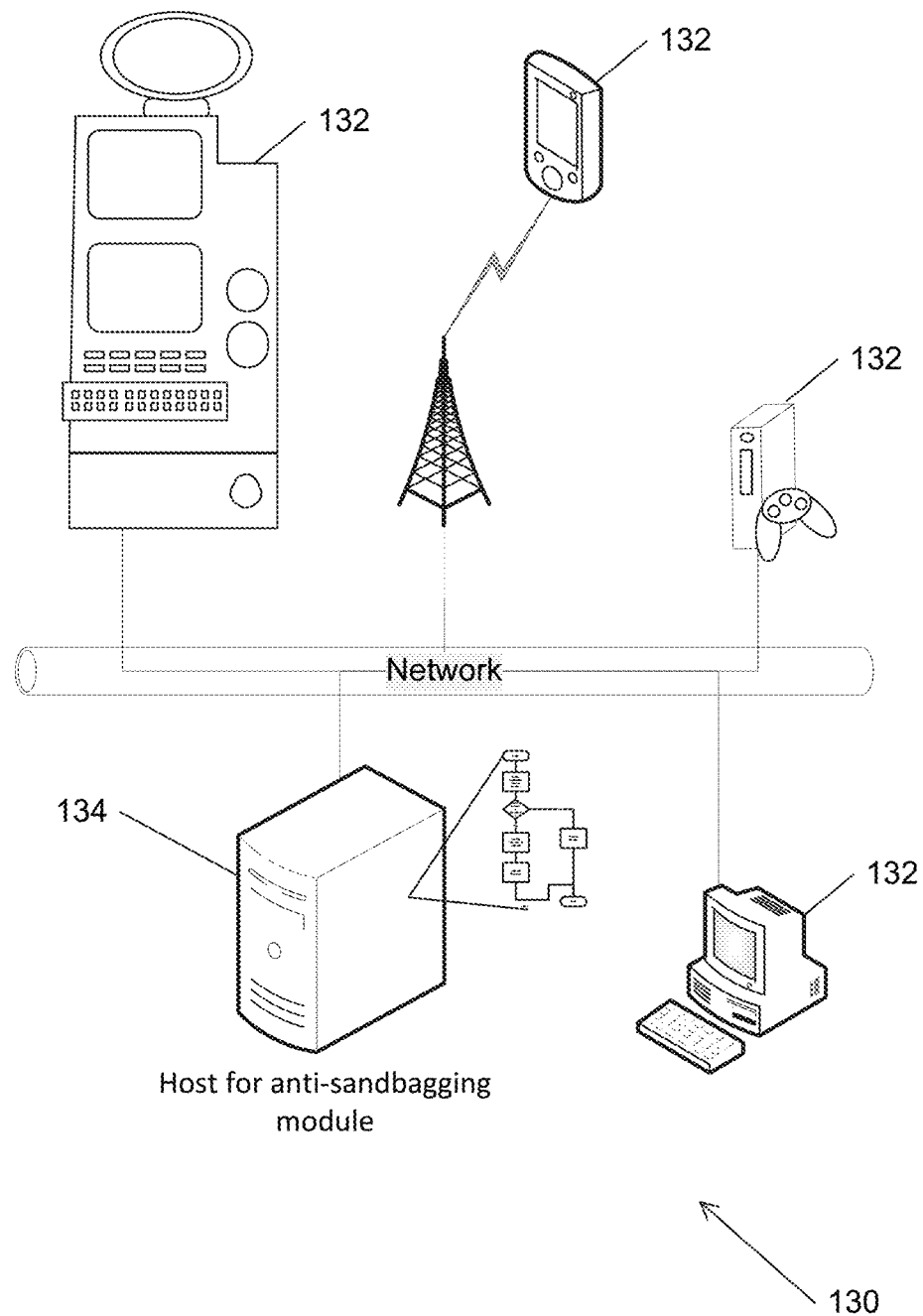
FIG. 1B is a deployment diagram illustrating an anti-sandbagging hybrid game in accordance with an embodiment of the invention.
Figure 1C:
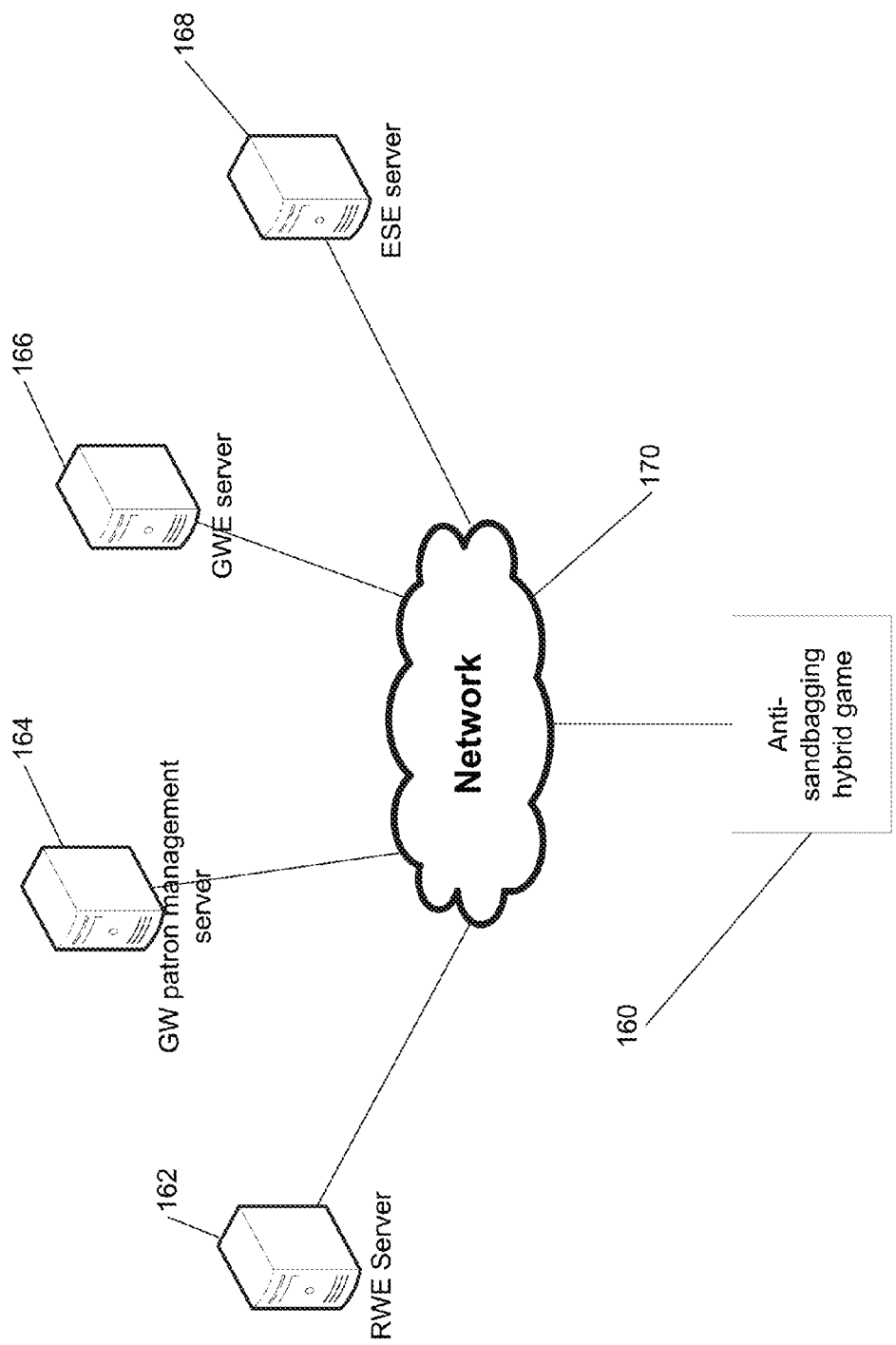

Anti-sandbagging hybrid games in accordance with many embodiments of the invention can operate locally while being network connected to draw services from remote locations or to communicate with other anti-sandbagging hybrid games. In numerous embodiments, an anti-sandbagging module receives player performance measurements from one or more anti-sandbagging hybrid games and determines an appropriate skill level or ranking for the player based on those player performance metrics and initiates anti-sandbagging provisions as may be appropriate. In a case where two or more players wish to compete against each other in a head to head anti-sandbagging hybrid game, the anti-sandbagging module determines an appropriate anti-sandbagging provision for each player based on a comparison of the player's rankings to historical performance measurements for the players. A deployment diagram of an anti-sandbagging hybrid game in accordance with an embodiment of the invention is illustrated in FIG. 1B. In the diagram, an anti-sandbagging hybrid game 130 may be hosted by any computing device 132 capable of presenting interactive entertainment and gambling games to a player, such as (but not limited to) a land based or casino gaming machine, a personal computer, a gaming console, a wireless device such as a personal digital assistant, notepad computer, or smart phone. The anti-sandbagging hybrid games 130 may include a server 134 hosting an anti-sandbagging module connected with the various computing devices via a computer network, such as a local area network or a wide area network.

In many embodiments, operations associated with an anti-sandbagging hybrid game such as (but not limited to) processes for calculating score or RWC and GWC tracking can be performed across multiple devices. These multiple devices can be implemented using or in connection with a single server or a plurality of servers such that an anti-sandbagging hybrid game is executed as a system in a virtualized space, such as (but not limited to) where the RWE and GWE are large scale centralized servers "in the cloud" coupled to a plurality of widely distributed ESE controllers or clients via the Internet.

In many embodiments, an RWE server can perform certain functionalities of a RWE of an anti-sandbagging hybrid game. In certain embodiments, a RWE server includes a centralized odds engine which can generate random outcomes (such as but not limited to win/loss outcomes) for a gambling game, thereby eliminating the need to have that functionality of the RWE performed locally within the anti-sandbagging hybrid game. The RWE server can perform a number of simultaneous or pseudo-simultaneous runs in order to generate random outcomes for a variety of odds percentages that one or more networked anti-sandbagging hybrid games may require. In certain embodiments, an RWE of an anti-sandbagging hybrid game can send information to a RWE server including (but not limited to) Table Ln-RWC tables, maximum speed of play for a gambling game, gambling game monetary denominations or any promotional RWC provided by the operator of the anti-sandbagging hybrid game. In particular embodiments, a RWE server can send information to a RWE of an anti-sandbagging hybrid game including (but not limited to) RWC used in the gambling game, player account information or play activity and a profile associated with a player.

In several embodiments, a GWE server can perform the functionality of the GWE across various anti-sandbagging hybrid games. These functionalities can include (but are not limited to) providing a method for monitoring high scores on select groups of games, linking groups of games in order to join them in head to head tournaments, and acting as a tournament manager.

In a variety of embodiments, management of player account information can be performed by a GWE patron management server separate from a GWE server. A GWE patron management server can manage player account information, including (but not limited to) data concerning players' characters, players' game scores, players' RWC and GWC and managing tournament reservations. Although a GWE patron management server is discussed separate from a GWE server, in certain embodiments a GWE server also performs the functions of a GWE patron management server. In certain embodiments, a GWE of an anti-sandbagging hybrid game can send information to a GW patron management server including (but not limited to) GWC and RWC used in a game, player account information, play activity and profile information for players and synchronization information between a gambling game and an entertainment game or other aspects of an anti-sandbagging hybrid game. In particular embodiments, a GW patron management server can send information to a GWE of an anti-sandbagging hybrid game including (but not limited to) entertainment game title and type, tournament information, Table Ln-GWC tables, special offers, character or profile setup and synchronization information between a gambling game and an entertainment game or other aspects of an anti-sandbagging hybrid game.

In numerous embodiments, an ESE server provides a host for managing head-to-head play, operating on the network of ESEs which are connected to the ESE server by providing an environment where players can compete directly with one another and interact with other players. Although an ESE server is discussed separate from a GWE server, in certain embodiments a GWE server also performs the functions of an ESE server.

Servers connected via a network to implement anti-sandbagging hybrid games in accordance with many embodiments of the invention can communicate with each other to provide services utilized within an anti-sandbagging hybrid game. In several embodiments a RWE server can communicate with a GWE server. A RWE server can communicate with a GWE server to communicate any type of information as appropriate for a specific application, including (but not limited to): configure the various simultaneous or pseudo simultaneous odds engines executing in parallel within the RWE to accomplish the anti-sandbagging hybrid game system requirements, determine metrics of RWE performance such as random executions run and outcomes for tracking system performance, perform audits, provide operator reports, and request the results of a random run win/loss result for use of function operating within the GWE (such as where automatic drawings for prizes are a function of ESE performance).

In several embodiments a GWE server can communicate with an ESE server. A GWE server can communicate with an ESE server to communicate any type of information as appropriate for a specific application, including (but not limited to): the management of an ESE server by a GWE server such as the management of an anti-sandbagging hybrid game tournament. Typically a GWE (such as a GWE that runs within an anti-sandbagging hybrid game or on a GWE server) is not aware of the relationship of itself to the rest of a tournament since in a typical configuration the actual tournament play is managed by the ESE server. Therefore, management of an anti-sandbagging hybrid game tournament can include (but is not limited to) tasks such as: conducting tournaments according to system programming that can be coordinated by an operator of the anti-sandbagging hybrid game; allowing entry of a particular player into a tournament; communicating the number of players in a tournament and the status of the tournament (such as but not limited to the amount of surviving players, their status within the game, time remaining on the tournament); communicating the status of an ESE contained in a game; communicating the performance of its players within the tournament; communicating the scores of the various members in the tournament; and providing a synchronizing link to connect the GWEs in a tournament, with their respective ESE's.

In several embodiments a GWE server can communicate with a GW patron server. A GWE server can communicate with a GW patron server to communicate any type of information as appropriate for a specific application, including (but not limited to) information for configuring tournaments according to system programming conducted by an operator of an anti-sandbagging hybrid game, exchange of data necessary to link a player's profile to their ability to participate in various forms of game play (such as but not limited to the difficulty of play set by the GWE server or the GWE in the game they are playing on), determining a player's ability to participate in a tournament as a function of a player's characteristics (such as but not limited to a player's gaming prowess or other metrics used for tournament screening), configuring the game contained GWE and ESE performance to suit preferences of a player on a particular anti-sandbagging hybrid game, as recorded in their player account, determining a player's play and gambling performance for the purposes of marketing intelligence, and logging secondary drawing awards, tournament prizes, RWC and GWC into the player's account.

In many embodiments, the actual location of where various algorithms and functions are executed may be located either in the game contained devices (RWE, GWE, ESE), on the servers (RWE server, GWE server, or ESE server), or a combination of both. In particular embodiments, certain functions of a RWE server, GWE server, GW patron server or ESE server may operate on the local RWE, GWE or ESE contained with an anti-sandbagging hybrid game locally. In certain embodiments, a server is a server system including a plurality of servers, where software may be run on one or more physical devices. Similarly, in particular embodiments, multiple servers may be combined on a single physical device.

Anti-sandbagging hybrid games in accordance with many embodiments of the invention can be networked with remote servers in various configurations. A networked anti-sandbagging hybrid game in accordance with an embodiment of the invention is illustrated in FIG. 10. The networked anti-sandbagging hybrid game 160 is connected with a RWE server 162, GW patron management server 164, GWE server 166 and ESE server 168 over a network 170, such as (but not limited to) the Internet. Servers networked with a networked anti-sandbagging hybrid game 160 can also communicate with each of the components of a networked anti-sandbagging hybrid game and amongst the other servers in communication with the networked anti-sandbagging hybrid game 160.

Although various networked anti-sandbagging hybrid games are discussed above, networked anti-sandbagging hybrid games can be configured in any manner as appropriate to the requirements of a specific application in accordance with embodiments of the invention. Assignment of handicaps within anti-sandbagging hybrid games is discussed further below.

Assignment of Handicaps as Anti-Sandbagging Provisions

Figure 2:
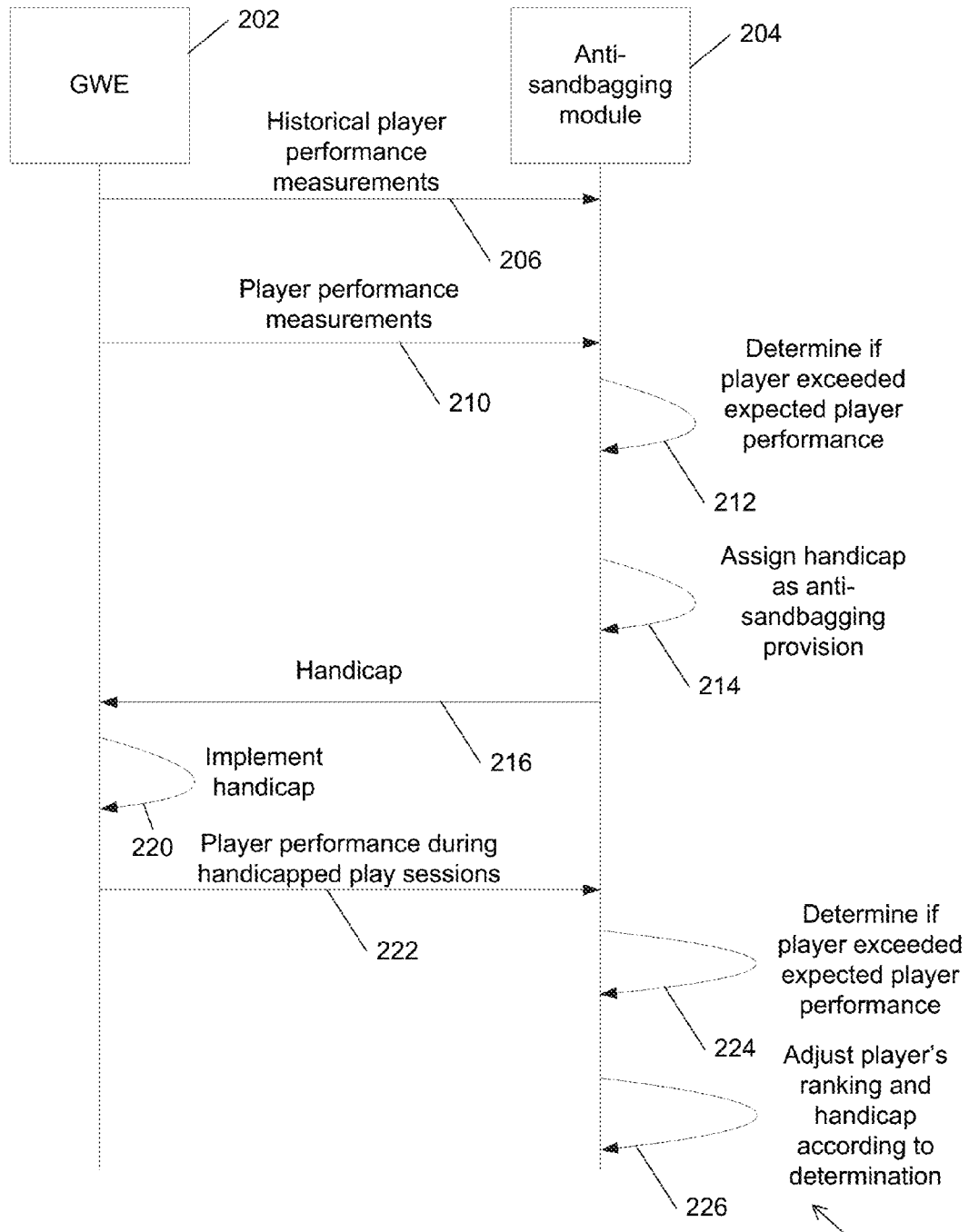
FIG. 2 is a sequence diagram illustrating the operation of an anti-sandbagging hybrid game that assigns a handicap as an anti-sandbagging provision according to a determination of whether a player significantly deviated from expected performance in accordance with an embodiment of the invention.

Anti-sandbagging hybrid games in accordance with many embodiments of the invention can provide the fairness of entertainment game play irrespective of player skill level by assigning handicaps as ant-sandbagging provisions to players based upon a player's performance measurements. An anti-sandbagging hybrid game includes a GWE that utilizes input from an anti-sandbagging module to implement the proper handicap to players to ensure fairness of entertainment game play. An anti-sandbagging module is able to assign handicaps based upon a player's ranking, and a player's ranking can be based upon performance measurements received from a GWE. A sequence diagram describing an anti-sandbagging hybrid game that assigns handicaps to players that can be dynamically adjusted by current play sessions in accordance with an embodiment of the invention is illustrated in FIG. 2. The timing diagram 200 includes an anti-sandbagging module 204 receiving (206) player performance measurements from a GWE 602 for a player. These performance measurements are stored as historical performance measurements to be used to evaluate the player's performance in a future playing session. In the same or subsequent playing session, additional player performance measurements are received (210) are received by the anti-sandbagging module 204. The anti-sandbagging module determines (212) if the player exceeded an expected player performance as described herein. If the player has exceeded the expected player performance, then a handicap as an anti-sandbagging provision is assigned to the player. The anti-sandbagging module then transmits (216) the assigned handicap to the GWE. The GWE then implements (220) the handicap during a player session, whether it be head-to-head or in solo play. Player performance measurements. The anti-sandbagging module also receives (222) information on player performance during the handicapped play sessions to determine (224) if the player significantly deviates from expected player performance in a statistically meaningful way. The information on player's performance can include current as well as historical player performance and can also include information on the particular player, other players or a group of players. If the player significantly deviates from the expected player performance in a statistically meaningful way, then the player's ranking can be adjusted (226) accordingly. In certain embodiments, the player's handicap is also adjusted according to the adjustment made to the player's ranking.

In some embodiments, the historical performance measurements are from players that are similarly ranked as the player being evaluated. That is, in the case that the player has asserted a particular ranking, the player may be evaluated to determine if the player has misstated their ranking by determining if the player's performance exceeded the player performance of similarly ranked players.

Randomness as Anti-Sandbagging Provision

The extent to which randomness, as opposed to skill, affects events in, or the outcome of, the entertainment game can be altered so as to reduce the impact of player skill relative to the impact of random events upon game play. In a shooting game, for example, the accuracy with which shots can be aimed at targets is a function of the aim of the player plus a random component that impacts the trajectory of the player's shot. The amount by which the trajectory is affected by the random component can be a small or large amount relative to the underlying accuracy with which the player actually aims the gun. The random component in this case can be thought of as a radius extending outward from the inherent aiming accuracy of the player, with the radius increasing to the extent which randomness is to play a greater role in determining the result of the shot, from a radius of zero to a radius much, much greater than the inherent accuracy of the player's aim.

In some embodiments, the introduction of randomness can be consistently applied across the game for all players participating in a game, or it can be applied independently as a function of each player's handicap (i.e. the measure of their skill in the game) on a player by player basis. The introduction of randomness can also be dynamically established during game play in response to an evaluation of the player's performance relative to historical norms for that player, or a population set of relevance (e.g. players with a similar handicap). If a player is outperforming his historical performance levels by a statistically significant margin as determined by the anti-sandbagging module, the amount of randomness introduced into the player action(s) under consideration will be increased on the fly, until such time as the player's performance in the game aligns more closely with the performance expected as a function of the player's professed skill level (i.e. his handicap).

Another example of using randomness as a handicap would be to introduce error in the steering (analogous to a "loose" steering system) of a race car game for the player who has been deemed by the anti-sandbagging system to be operating outside normal level ranges (in a statistically significant way) of play given the player's professed level of skill.

Scoring as Anti-Sandbagging Provision

Conventionally, games utilize an absolute scoring system to evaluate performance of the player. As a mechanism to preclude sandbagging, the invention allows for a relative scoring system to be utilized, such that the amount of GWC that a player accumulates during a game and at its conclusion, as a function of various actions and/or achievements, is scaled as a function of one of a number of factors. Factors that can algorithmically modify the baseline (i.e. absolute) scoring system (inclusive of the game's modifications to scoring as a function of level of difficulty and/or other variables) resident in the game include, but are not limited to the following.

In some embodiments, a modifier to the score is applied as a function of player skill—either demonstrated in the immediate context of the game or based upon prior performance within the game or prior game play sessions. To do so, a modifier to the score as a function of the player's performance in the game relative to his expected performance based upon a previously established handicap as established by the anti-sandbagging module Through the use of one or more such modifiers, a skilled player is in effect discouraged from sandbagging because his score can be retarded as a function of demonstrated performance superior to expected or professed capability. For example, in a game of pop-a-shot, two players enter a head-to-head tournament professing to be "Beginners" (meaning in this case they are likely to hit less than 40% of their shots), information contained within their player profile. In reality one of these players, Player B, is "Advanced", meaning he can hit over 70% of his shots in the game, but he has sandbagged his previous playing of the game to trick the system into believing he is a Beginner. The game is slated to take four minutes. During the first minute, the game calculates that Player B is hitting 75% of his shots, and determines, by comparing this performance against the historical performance of legitimate beginner players during the first minute of play, that this performance is, statistically speaking, only 10% likely to represent the play of an actual beginner player. As a result, subsequent baskets made by player B, instead of being worth 10 points are worth a lesser amount. In this example, they are now worth only four points, which corresponds to a score that would drive player B to a number of points equivalent to the median of "Beginner" players (i.e. hitting 75% of his shots at 40% of the nominal score makes each attempt worth three points, which would be equivalent to a Beginner player hitting 30% of his shots).

In many embodiments, this process could be revisited continuously throughout game play, periodically, or a single time as a function of set up parameters controlled by the Casino via the anti-sandbagging module of the GWE of the anti-sandbagging hybrid game. The algorithmic modification of the score can take as arguments not only the aforementioned evaluation of skill and the players' professed skill, but can also take into account the gap in score between the player or players relative to each other, or a historical record of score history for the players themselves or a class of players to which they each belong (i.e. "Beginner", players who have played in excess of twenty times, players over 65 and with less than twenty plays, etc.). As such, the anti-sandbagging hybrid game can modify a player's score downwards or upwards more or less via the aforementioned mechanisms (and others) to ensure that the game remains "close".

Bet Value Limits as Anti-Sandbagging Provision

In another embodiment, the anti-sandbagging hybrid game enforces limits on the value of bets that can be placed, and/or the amount that can be won, by players as a function of the professed skill level of one or more of the players, these limits being established by the casino or operator. Generally speaking, the amount that can be bet on a game, an intermediate outcome of a game, or an intermediate or final characteristic of the game would be limited. Limiting the amount that can be wagered in this way dissuades high skill players from masquerading as lower skill players because the amount of money they can win is less. This functionality, configured by the casino or operator via the anti-sandbagging function within the GWE, can take a number of forms, including, but not limited to, the following.

Maximum bets limited for all players as a function of the lowest professed skill level of all players in the game. For example if two players are going to be competing in a football game, the lower skill level player's level (e.g. "high school", "college", "pro" might be the levels used to grade players in the context of the football game) will govern the maximum bet that can be made for each available wager between the players.

Bet Volume Limits as Anti-Sandbagging Provision

In another embodiment, the anti-sandbagging hybrid game enforces limits on the number of bets that can be placed, and/or the aggregate value of bets placed and/or the aggregate value of bets won, by players over time as a function of the professed skill level of one or more of the players, these limits being established by the casino. This functionality can take a number of forms, including, but not limited to, the following or some combination thereof.

Maximum number of bets a player can place over a fixed period of time, or a fixed number of game plays, or in the absolute. This cap may be applied in the context of the player's professed skill level as recorded in their player profile, such that if the player moves up or down a skill level the cap can be periodically reset.

Maximum number of bets a player can win over a fixed period of time, or a fixed number of game plays, or in the absolute. This cap may be applied in the context of the player's professed skill level as recorded in their player profile, such that if the player moves up or down a skill level the cap can be reset.

Maximum value of bets a player can place over a fixed period of time, or a fixed number of game plays, or in the absolute. This cap may be applied in the context of the player's professed skill level as recorded in their player profile, such that if the player moves up or down a skill level the cap can be reset.

Maximum value of bets a player can win over a fixed period of time, or a fixed number of game plays, or in the absolute. This cap may be applied in the context of the player's professed skill level as recorded in their player profile, such that if the player moves up or down a skill level the cap can be reset.

Penalty Assessment as Anti-Sandbagging Provision

In another embodiment, the anti-sandbagging hybrid game prevents sandbagging by monitoring player performance in the anti-sandbagging hybrid game against the historical performance of all players of the same overarching skill level, and/or a representative but static data set of similar information and/or against the player's own historical performance. The GWE anti-sandbagging module (or a server based version of the anti-sandbagging module interfacing to a number of GWEs) utilizes statistical methods to establish, to a prescribed confidence interval, whether the player's performance in the game suggests that the player is of a higher skill level than the professed skill level of the player as recorded within his player profile. A counter is maintained in the player's profile as to the number of times that the player's performance exceeds the statistically expected performance for a player of the professed skill level. When the counter reaches a certain level (A), a warning may be issued to the player. The counter may reflect (non-comprehensively) the number of individual game sessions in which sandbagging was identified, or the number of specific intervals (e.g. time or levels) of game play in which sandbagging was identified, or the number of times sandbagging occurred and a bet over a certain amount was won, or a combination of these factors, etc. When the counter reaches a second threshold (equal to or greater to the level A), (B), the player may have his account flagged for manual review and a higher level of go-forward scrutiny, and his skill level ratcheted up one level. At a third threshold (C), the player's account may be temporarily suspended, and at a fourth threshold (D) the account may be permanently closed and the individual behind the account precluded from participating in subsequent activities within the game in question, the casino in question and/or the casino group in question. The thresholds A through D may be coincident or reflect a step-wise (but not necessarily linear) increase in the counter, and a variety of different punitive actions (distinct from the exemplary list above) may be implemented. The withholding of winnings, reduction of winnings, or the assessment of penalties or fines (against a deposit that could, for example, be required by players to participate in the skill based wagering aspect of anti-sandbagging hybrid game play) can accompany crossing one or more of the thresholds A through D.

Note also that the such an embodiment is not limited expressly to four levels of punitive action, but that any number from 1 to n may be included as part of the Penalty Assessment construct. Generally speaking, the penalty assessment methodology establishes a series of penalty thresholds. For each threshold a specific punitive action is prescribed. Penalty thresholds are reached as a function of the player having been found to be sandbagging a certain number of times. The counter used to establish whether a threshold has been crossed can track one or more measures of sandbagging frequency within a single counter (i.e. each game in which a player sandbags across multiple game titles can be tracked singularly), or multiple counters can be used in parallel across different games or to measure sandbagging along multiple dimensions within a single game, each triggering thresholds independently.

For example, consider a first person shooter game, where a player professes to be of intermediate skill, but actually has the capabilities of an expert. Having sandbagged for a number of games to establish his skill as intermediate he enters into a head-to-head competition with a truly intermediate player, and then plays to the fullest of his ability. The GWE anti-sandbagging module compares the accuracy of the player's shooting over a period of twenty shots against the distribution of accuracy for players graded as intermediate and determines with a high degree of statistical confidence that the player is in fact not an intermediate player. The counter increases from 0 to 1, and in this case threshold A is crossed at a count of "one instance where the player's shooting accuracy is statistically such that it is not of an intermediate level". A warning is issued to the player and game play continues. Two more samples of twenty shots are evaluated subsequently, and because the determination is made that the player is still performing at a level significantly above that of an intermediate player the counter has incremented to three, and threshold B is crossed, causing the player's account to be flagged for review, a second warning issued, and the player's professed skill as recorded in his profile to be elevated to "expert" for subsequent game play.

In some embodiments, the aforementioned counter is maintained until a resetting event takes place, such as a certain number of game plays or a certain amount of elapsed time without any increase in the counter.

Note also that the penalties assessed can be "outside" the entertainment game (e.g. suspension of a player's account, disgorgement of winnings, resetting the player's handicap to a higher level), or "inside" the entertainment game (e.g. player's character is severely injured by stepping on a land mine, the player's gun jams, the player's football team is assessed a penalty and loss of down in a football game, etc.).

Reducing the Benefits of Skill Via the Introduction of Deterministic Errors as Anti-Sandbagging Provision In some embodiments, performance in the context of the entertainment game is a function of both player skill and a certain degree of randomness introduced during game play. To address perceived sandbagging (as measured in the manner previously described, i.e. a statistically significant deviation of current player performance relative to a standard or norm) a deterministic (instead of random) error (which need not be a static value) is injected into the entertainment game. For example, in a first person shooter game, if the anti-sandbagging module determines that the player is sandbagging, a deterministic error in the player's aim can be introduced into the data encapsulating the aim of the weapon generated in the entertainment game when the player fires his weapon, before such data is used by the game to establish whether the target was hit. The introduction of this inaccuracy can take place between the player's game controller and the ESE, or within the ESE itself (as a function of a flag set by the GWE or other means), after data from the controller has been received.

While it is possible for the player to ultimately compensate for deterministic errors, they still have the effect of causing the player to perform at a lower level than otherwise for a period of time.

In various embodiments, the amount of error introduced (or its vector) can be altered over time as a function of the current status of the player's performance relative to his professed skill. In this way a feedback loop is at work, continuously adjusting the vector of the error introduced until the player's measured performance is in line with expected norms given his professed skill level.

Ringer Detection as Anti-Sandbagging Provision

Another form of sandbagging consists of players introducing "ringers" i.e. imposters whose pretense is intended to gain an advantage in competition, as replacements in head-to-head and/or tournament play. For example, an intermediately skilled Scrabble® player may be ranked appropriately, but allow a highly skilled player to use his account, making a number of bets regarding the progress or outcome of the game, and in such tournament play at his true level of skill (i.e. "expert"), thereby giving him a substantial advantage over the true beginner players in the tournament. Such a player would be guilty of using a ringer. Linking an individual player to a specific account prevents ringers.

In some embodiments, the anti-sandbagging module uses biometric identification methods. In order to confirm the identity of the player and to prevent a player from re-enrolling under a different name, player names and/or accounts are linked to specific biometric measurements. Such measurements could include but are not limited to: retinal scans, iris recognition, fingerprints, palm prints, facial/image recognition, and voice prints. These measurements could be used for both positive and negative biometric identification. Initial measurements may be taken during account set-up, when first engaging in gameplay, or when issued a unique ID such as a ticket, code, or other means for anonymous play. Biometric data would "travel with" any unique ID or account.

In many embodiments, players confirm biometric identification as soon as a he logs into an account or starts gameplay. If a player fails to provide accurate biometric measurements, the anti-sandbagging module may first issue a warning and allow the player to submit measurements again. Further failures subject players to the penalty assessments described above.

In numerous embodiments, biometric identification methods are used when the anti-sandbagging module alerts the operator that play is inconsistent with past performances. Gameplay may pause, requiring the player to immediately submit to biometric identification. Alternatively, the anti-sandbagging module may periodically take unobtrusive biometric measurements to confirm identification throughout gameplay. Failure to provide accurate biometric measurements subjects players to the penalty assessments described above.

In some embodiments of individual recognition, the player may be required to answer specific questions. These can include security questions established at account creation, questions regarding past performances, questions about account set-up date, etc. Failure to provide accurate answers subjects players to the penalty assessments described above.

In numerous embodiments, player geographic location or IP addresses may be tracked. Changes in either may subject players to a higher degree of scrutiny or the penalty assessments described above.

Accommodating Improving Skills

In an anti-sandbagging hybrid game, performance in the context of the entertainment game is a function of both player skill and a certain degree of randomness introduced during game play. However, player skill level is not necessarily a fixed factor. As players experience the game, their skill levels may measurably improve (a beginner player becomes an intermediate player, and so on). Such an increase of skill could expose a player to censure by the anti-sandbagging module. To avoid penalizing players gaining skill rather than sandbagging, in some embodiments, upon detection that a player has improved progressively over recorded levels, the anti-sandbagging module could allow for raising the expected level of the player. Alternatively, players could self-report increases of skill and thus increase expected performances before engaging in play.

In various embodiments, at the onset of any game session the player is informed by the system as to their professed skill (if one is on record at all), and asked to confirm or alter the skill level. If no professed skill (handicap) is on record, the player selects the skill level they believe to be appropriate. This notification could be incorporated into player/account selection at the start of gameplay rather than as a separate event.

In many embodiments, there is a short period at the onset of gameplay during which the anti-sandbagging module assesses player skill level and evaluates whether the professed skill level matches demonstrated skill. If there is a disparity, the hybrid game is paused and a player is given the option to alter his skill rating. This allows the player to more accurately self-report skill level and skill level changes.

In some embodiments, a player can use the anti-sandbagging hybrid game in a mode (for a short period of time and for free) whereby they are "tested" to establish an updated handicap. This mode would be finite rather than the beginning of gameplay.

In numerous embodiments, a player can, at any time, interface with the UI of a suitably configured anti-sandbagging hybrid game, a dedicated terminal, and/or a person operating a dedicated terminal or application, to report in with a new skill level.

In many embodiments, a player is "tested" for actual v. professed skill periodically, (e.g. day, week, month, every X game plays) through free game play or as part of the player's paid game play (during which time the player may or may not be engaged in head-to-head competition, and may or may not be permitted to gamble).

These embodiments may or may not require participation in a player club. When a player club is unavailable or a player elects not to participate in one, the player is still identified. Rather than linked explicitly to a specific account, the player is anonymously tracked, via the use of a ticket, code, or other means by which he is given a unique ID that persists but is not tied to his person (i.e. not linked specifically to his name, etc.).

The process of initiating an anti-sandbagging provision has been described as taking place within the GWE anti-sandbagging module. The anti-sandbagging module interacts with the ESE to implement the aforementioned embodiments. The GWE anti-sandbagging module communicates with the ESE to cause the ESE to alter the entertainment game environment and/or game play to impose penalties as necessary. Certain embodiments, such as bet volume limits, do not invoke this GWE-ESE interaction, but others, such as the introduction of random or deterministic errors require handshaking between the GWE and ESE to affect the penalty or penalties.

Although various anti-sandbagging hybrid games constructed to assign handicaps to players are discussed above, anti-sandbagging hybrid games can be constructed to assign handicaps as anti-sandbagging provisions in any manner as appropriate to the requirements of a specific application in accordance with embodiments of the invention. Assignment of rank in anti-sandbagging hybrid games are discussed further below.

Rank Assignments

Performance in the context of the entertainment game in accordance with many embodiments of the invention is a function of both player skill and a certain degree of randomness introduced during entertainment game play. In order to apply the correct handicap, a player's skill level is ranked. As a player's skill level increases or decreases, the player's overall rank, and therefore handicap, can be adjusted to reflect the change in player skill level. Additionally, a player's skill level at a particular entertainment game may not be related to the player's skill level at other entertainment games. For example, success in a racing type entertainment game may not be indicative of the player's skill level in a shooting type entertainment game. However, a player's skill level in one game may be related to a player's skill level in a related game, such as sequels to the same entertainment game.

In many embodiments, a player may be ranked depending on the ratings of the player's opponents, and the results of the player's play against the opponents. In certain embodiments, the relative difference in rating between two players determines an estimate for the expected score between them. The design of the ranking system, including the range and mean rank may be chosen by the operator as appropriate for the anti-sandbagging hybrid game. Thereby, rankings are calculated based on the strength of a player's opponent and the actual results of the game play between the players. This system, where performance is not measured absolutely, allows handicapping inferred from wins, losses, and draws against other players. If a player wins a game, the player is assumed to perform at a higher level than his opponent for that game. Conversely if a player loses, the player is assumed to perform at a lower level than the opponent. If the game is a draw, the two players are assumed to perform at nearly the same skill level.

In several embodiments, these rankings are then used to predict performance so handicapping can be applied. When a player's results exceed the player's expected scores, the system takes this as evidence that a player's ranking is too low, and can be adjusted upward. Similarly when a player's actual results fall short of the player's expected scores, that player's ranking can be adjusted downward. The anti-sandbagging module may use a simple linear adjustment proportional to the amount by which a player over performed or underperformed the expected score. This type of system can be used in a variety of entertainment games. Additionally, this rating can be applied when a player's performance is measured over time, rather than during play of single gaming session. The adjustment mechanism may also include a "deadband" or weighting functionality such that the player's rating is not immediately adjusted solely as a function of a single or recent performance(s), but rather considers recent results in the context of a broader set of player performance data.

In numerous embodiments, different rankings can be divided into "bands of skill," (similar but not the same as the popular chess ranking system Elo, where a player with an Elo rating from 2000-2199 may be considered an expert, while a rating from 600-799 may be considered a beginner). This allows a general handicap to be assigned to different skill bands rather than to individual ranks depending on the entertainment game in question.

In a variety of embodiments, players are placed on a "ladder" and each player is assigned a numerical value that shows how skilled the player is at a certain game. The ladder system proceeds via a system of challenges. Head to head games may occur on a scheduled or ad hoc basis between different rungs on the ladder. In ad hoc play, a first player may challenge a player at a higher level on the ladder. In certain embodiments, refusing a challenge may lead to penalties for the refusing player (such as but not limited to reduction in rank, and/or being barred from tournaments). If the low-ranked player wins the match, then the two players swap places on the ladder or are moved up and down a certain number of "rungs" on the ladder (which may also affect the position of other players between the two rungs initially occupied by the two players). If the low ranked player loses, then that player may be banned from challenging the same person again without challenging someone else first. There may be a limit as to how many rungs above themselves players may challenge. Initial placement on the ladder may be random or deterministic based upon an entry test/challenge.

In a number of embodiments, player ranking may be assigned on level based progression. A player can accumulate experience points (XP) based on play time, tasks undertaken, skills learned and/or a variety of other criterion. To "level" or "level up," a player gains enough XP to reach the next level. When a level is gained, the player's abilities or statistics increase, making the player stronger. In a number of embodiments, a player's ranking is based (at least in part) on the level attained by the player, and a handicap assigned accordingly.

In many embodiments, skill level may be assigned based on performance in specific aspects of the game. In certain embodiments involving a hunting game, factors including but not limited to accuracy, type of animals killed, and kill quantities may be valued separately and then combined to provide the overall ranking. In particular embodiments, skill level is not necessarily based on wins/loses, and handicapping may be applied based on specific aspects of the game (a skilled player in each aspect of the above hunting game may be handicapped with features such as, but not limited to, less accurate guns, fewer numbers of animals, or more difficult kill-shots).

In several embodiments, there can be a short period at the onset of game play during which the anti-sandbagging module assesses player's current skill level and evaluates that skill level relative to the player's historical skill level(s) before applying the appropriate handicap. In a number of embodiments, the anti-sandbagging module assesses player skill level throughout game play to evaluate the player's skill level. The anti-sandbagging module may then apply the appropriate handicap at the conclusion of the game play session.

In various embodiments, a player can use an anti-sandbagging hybrid game in a mode (such as for a short period of time and/or without payment) whereby the player is "tested" to establish a skill rating. This mode can be finite rather than at the beginning of gameplay. Also, this test mode can be distinct from actual gameplay.

In numerous embodiments, if no professed skill is on record, players may select the skill level they believe to be appropriate. This selection could be incorporated into player/account selection at the start of gameplay rather than as a separate event. As play continues, the player's performance is measured and compared to others of the professed skill level. Where there are discrepancies, the rating assigned and the handicap applied is adjusted. Alternatively, players that estimate their performance inaccurately may be disqualified from play.

In several embodiments, ranking systems can implement skill floors for individual players. A skill floor is the minimum ranking that a player can fall to. For instance, if a player has an established ranking of "expert", subsequent poor performances cannot reduce his ranking to "beginner." However, depending on the hybrid game in question, an "expert" player may have his or her rank decreased to an "intermediate player," depending on the skill floor assigned. A skill floor may be assigned according to any arbitrary criteria, including but not limited to the number of games played, amount of money won, amount of games won, and/or additional factors that can be used establish a player's skill level.

Several embodiments may or may not require participation in a player club. When a player club is unavailable or a player elects not to participate in one, the player is still identified. Rather than linked explicitly to a specific account, the player is anonymously tracked, via the use of a ticket, code, or other means by which a player is given a unique ID that persists but is not tied to a player's person (such as but not limited to not being linked specifically to the player's name).

In numerous embodiments, rankings may be continuous or discrete. Rankings may be specific to the casino, the casino family, and/or geographic location or other divisions. The anti-sandbagging module may function to normalize disparate rankings or rankings across multiple systems and locations.

Figure 3A:
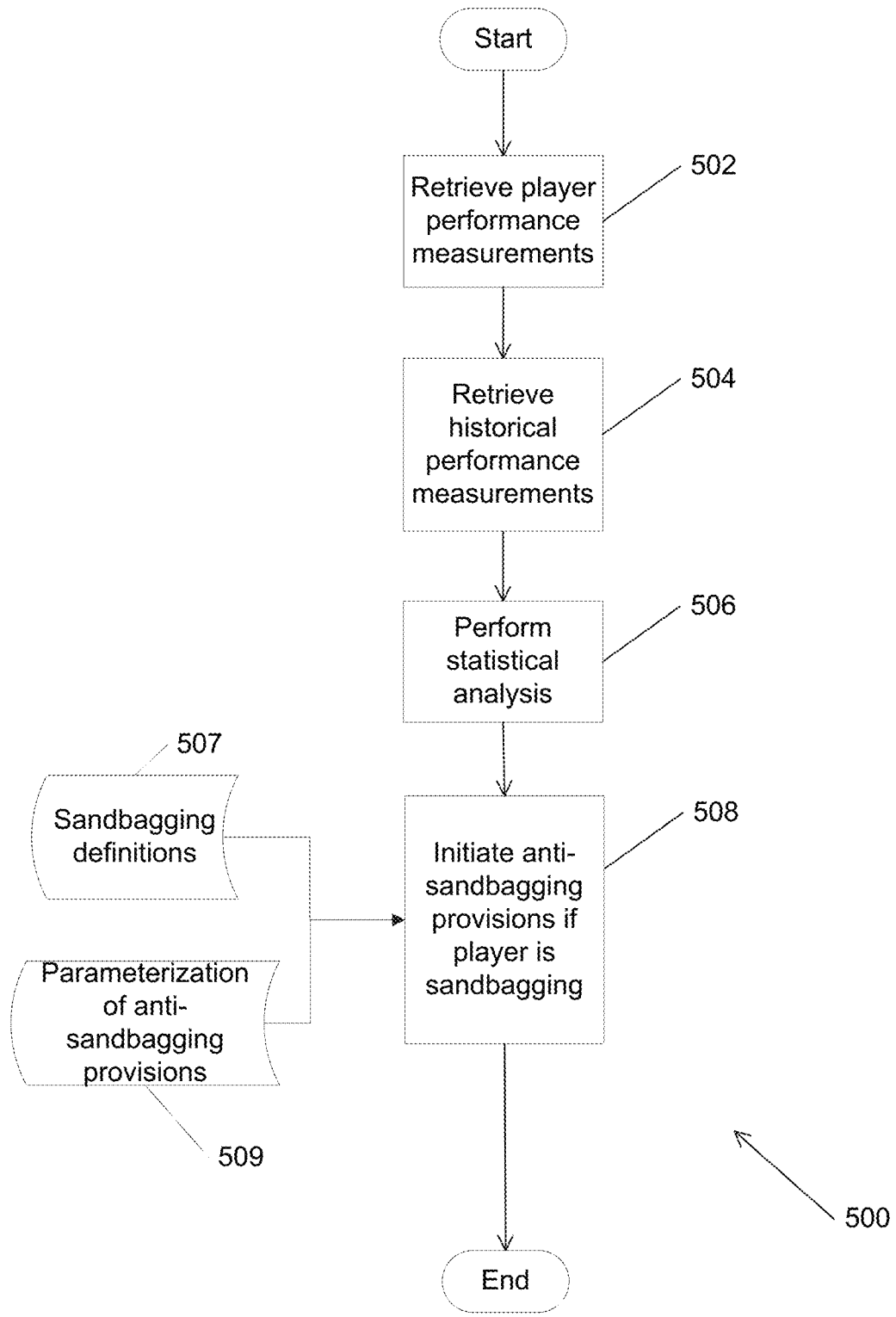
FIG. 3A is a flow chart of a process of using an anti-sandbagging module to determine whether a player's current performance significantly deviated from historical performance in accordance with an embodiment of the invention.

A process flow diagram of a process for determining if a player's current performance at an anti-sandbagging hybrid game exceeds historical performance in accordance with an embodiment of the invention is illustrated in FIG. 3A. The process 300 includes an anti-sandbagging module retrieving current player performance measurements (502) and historical performance measurements (504) for a player while playing an anti-sandbagging hybrid game. The historical performance measurements are for the particular player's historical performance measurements. The order in which current player performance measurements and historical performance measurements are retrieved is non-limiting and can be retrieved in any order. The anti-sandbagging module then performs (206) statistical analysis upon the current player performance measurements and historical performance measurements. If there is sufficient deviation from expected performance measurements as defined in sandbagging definitions 507, then the player's rankings and corresponding handicaps as anti-sandbagging provisions can be adjusted (508) according to any of the anti-sandbagging provisions described herein and as specified by an operator's anti-sandbagging parameters 509. In various embodiments, the player's ranking, and subsequent handicap, may be re-ranked upward to a higher rank. However, if the currently player's performance measurement information indicates a poorer quality of fair play during the current play session, the player's rank, and subsequent handicap, may be adjusted to a lower value.

In many embodiments, an outlier test is used to determine if the player's current performance information indicates that the player has significantly deviated from expected performance. In certain embodiments, an outlier test such as (but not limited to) the Grubb's outlier test can be used. The Grubb's outlier test can be used to detect outliers in a data set assumed to come from a normally distributed population. To perform the Grubb test, a value T is calculated:

$$T = \text{Abs}(X_i - X\text{mean})/s$$

where:
Abs( )=absolute value function;
$X_i$=observed player performance measurements for a current play session;
Xmean=mean of historical player performance measurements for previous play sessions; and
s=standard deviation of Xmean.

Once T is calculated, a lookup table is used to determine the probability that a rejection of $X_i$ as belonging to the population of Xmean is improper. For example, the lookup table illustrated in FIG. 3B can be utilized. In FIG. 3B, the headings represent the probability, in percentages, that a rejection is improper, and N is the number of sampled historical data points for player performance that were used to calculate Xmean.

In other embodiments, any technique for determining whether player performance is inconsistent with past performance can be utilized as appropriate to the requirements of a specific anti-sandbagging hybrid game.

The table is used by looking up the value of T in the table for the number N samples. Then, the probability is determined by looking up the column to the probability value featured in the header. For example, if N=20 sampled player performance measurements and T is calculated to be 2.71, then the rejection of $X_i$ as not belonging to the population of the sampled player performance measurements has a 2.5% chance of being improper. Put another way, there is a 97.5% chance the particular instance of player performance is proper.

In several embodiments, outlier tests such as (but not limited to) Dixon's Q-test are used. In a Dixon Q-test, a ratio of distance between a tested value and its next closest value in a set of sampled values as compared to the range of all values in the sample is used to determine if the tested value comes from the same population as the set of sampled values. In certain embodiments, a process for determining a Q-test is as follows.

The sampled values of historical player performance measurements are arranged in ascending order:

$$x_1 < x_2 < \ldots < x_N$$

A ratio, $Q_{exp}$, is calculated as the difference between the value of the currently player performance measurement, $X_N$, being tested from its nearest neighbor value, $X_{N-1}$, divided by the range of the values of player performances:

$$Q_{exp} = \frac{X_2 - X_1}{X_N - X_1}$$

$$Q_{exp} = \frac{X_N - X_{N4}}{X_N - X_1}$$

The obtained $Q_{exp}$ value is compared to a critical Q-value ($Q_{crit}$) found in the table containing the critical Q values produced below. If $Q_{exp} > Q_{crit}$ for a particular confidence interval, then the tested player performance value can be characterized as an outlier, that is, that the current player performance measurement may significantly deviate from expected player performance measurements in a statistically meaningful way.

A table containing the critical Q values for confidence level (CL) 90%, 95% and 99% and N=3-10 is given below:

| | Table of critical values of Q | | |
|---|---|---|---|
| N | $Q_{crit}$ (CL: 90%) | $Q_{crit}$ (CL: 95%) | $Q_{crit}$ (CL: 99%) |
| 3 | 0.941 | 0.970 | 0.994 |
| 4 | 0.765 | 0.829 | 0.926 |
| 5 | 0.642 | 0.710 | 0.621 |
| 6 | 0.560 | 0.625 | 0.740 |
| 7 | 0.507 | 0.568 | 0.680 |
| 8 | 0.468 | 0.526 | 0.634 |
| 9 | 0.437 | 0.493 | 0.598 |
| 10 | 0.412 | 0.466 | 0.568 |

In certain embodiments, the expected performance can be the player's own historical performance while playing a particular hybrid game. In particular embodiments, the expected performance can be the performance of other players having the same or similar ranking as the player in question for a particular hybrid game.

Although various anti-sandbagging hybrid games constructed to evaluate the rank of players are discussed above, anti-sandbagging hybrid games can be constructed to evaluate rank in any manner as appropriate to the requirements of a specific application in accordance with embodiments of the invention.

Figure 4:
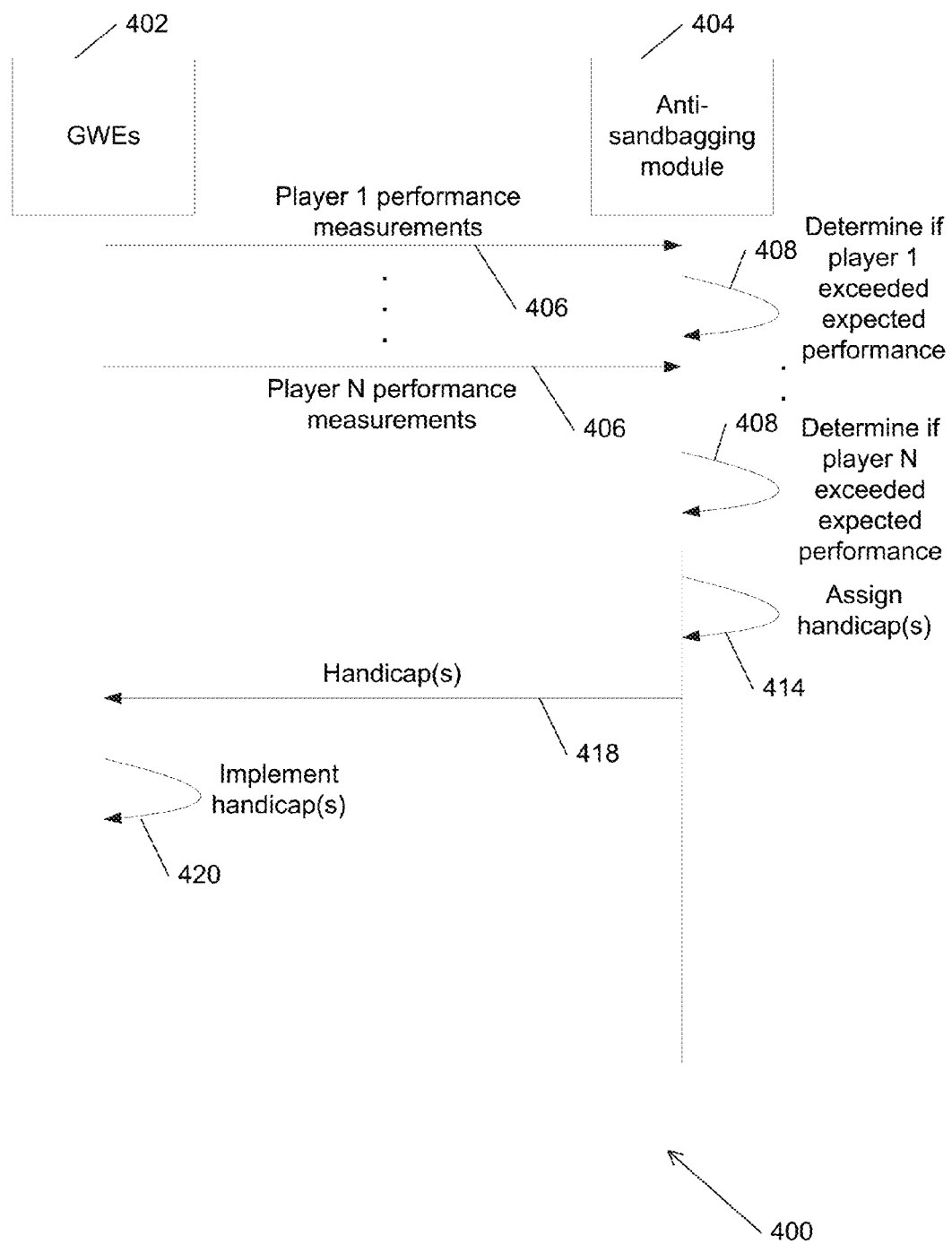
FIG. 4 is a sequence diagram illustrating the operation of an anti-sandbagging hybrid game that adjusts a group of player's handicap as an anti-sandbagging provision according to a determination of whether the players significantly deviated from their expected performance in accordance with an embodiment of the invention.

A sequence diagram illustrating the operation of an anti-sandbagging hybrid game that assigns handicaps as anti-sandbagging provisions according to player skill level in accordance with an embodiment of the invention is illustrated in FIG. 4. The sequence diagram 400 includes interactions between one or more GWEs 402 of one or more anti-sandbagging hybrid games and an anti-sandbagging module 404. The sequence includes an anti-sandbagging module receiving (406) player performance measurements for each player 1 to N from one or more GWEs 402 and determining (408) if each player 1 to N exceeded their respective expected performance based upon how each player's performance measurements are related to respective historical performance measurements of the player. As the players are evaluated for sandbagging, appropriate handicaps are assigned (414) for each of the players based upon the determination of sandbagging for each player. The anti-sandbagging module then returns (418) instructions to apply appropriate handicaps as anti-sandbagging provisions or each player to the one or more GWEs and the GWEs implement (220) the handicaps as appropriate.

Figure 5:
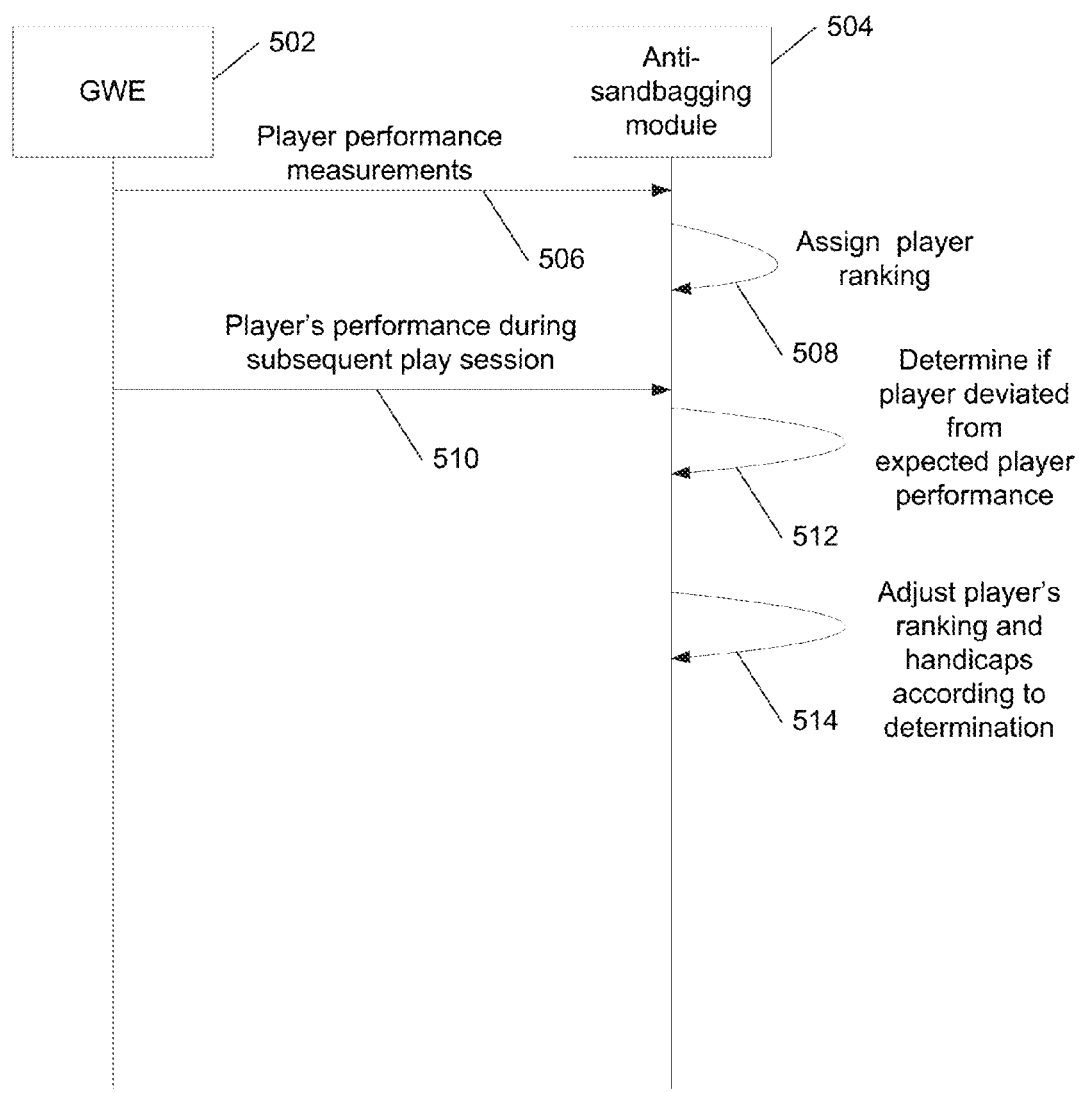
FIG. 5 is a sequence diagram illustrating the operation of an anti-sandbagging hybrid game that adjusts a player's handicap as an anti-sandbagging provision according to a determination of whether the player significantly deviated from expected performance in accordance with an embodiment of the invention.

A sequence diagram illustrating the operation of an anti-sandbagging hybrid game that adjusts a player's ranking dynamically in accordance with an embodiment of the invention is illustrated in FIG. 5. The anti-sandbagging module 504 receives (506) player performance measurements from a GWE 502 and assigns (508) a player ranking based upon the player performance measurements. Then, the anti-sandbagging module 504 receives (510) player performance measurements from subsequent sessions of entertainment game play after the initial ranking was assigned. The anti-sandbagging module 504 can analyze the subsequent performance measurements to determine (512) if the player significantly deviated from expected player performance and adjust (514) the player's rankings and handicaps applied as ant-sandbagging provisions in light of the significant deviation.

Although various anti-sandbagging hybrid games constructed to assign rank to players are discussed above, anti-sandbagging hybrid games can be constructed to assign rank in any manner as appropriate to the requirements of a specific application in accordance with embodiments of the invention.

Processing Apparatus

Figure 6:
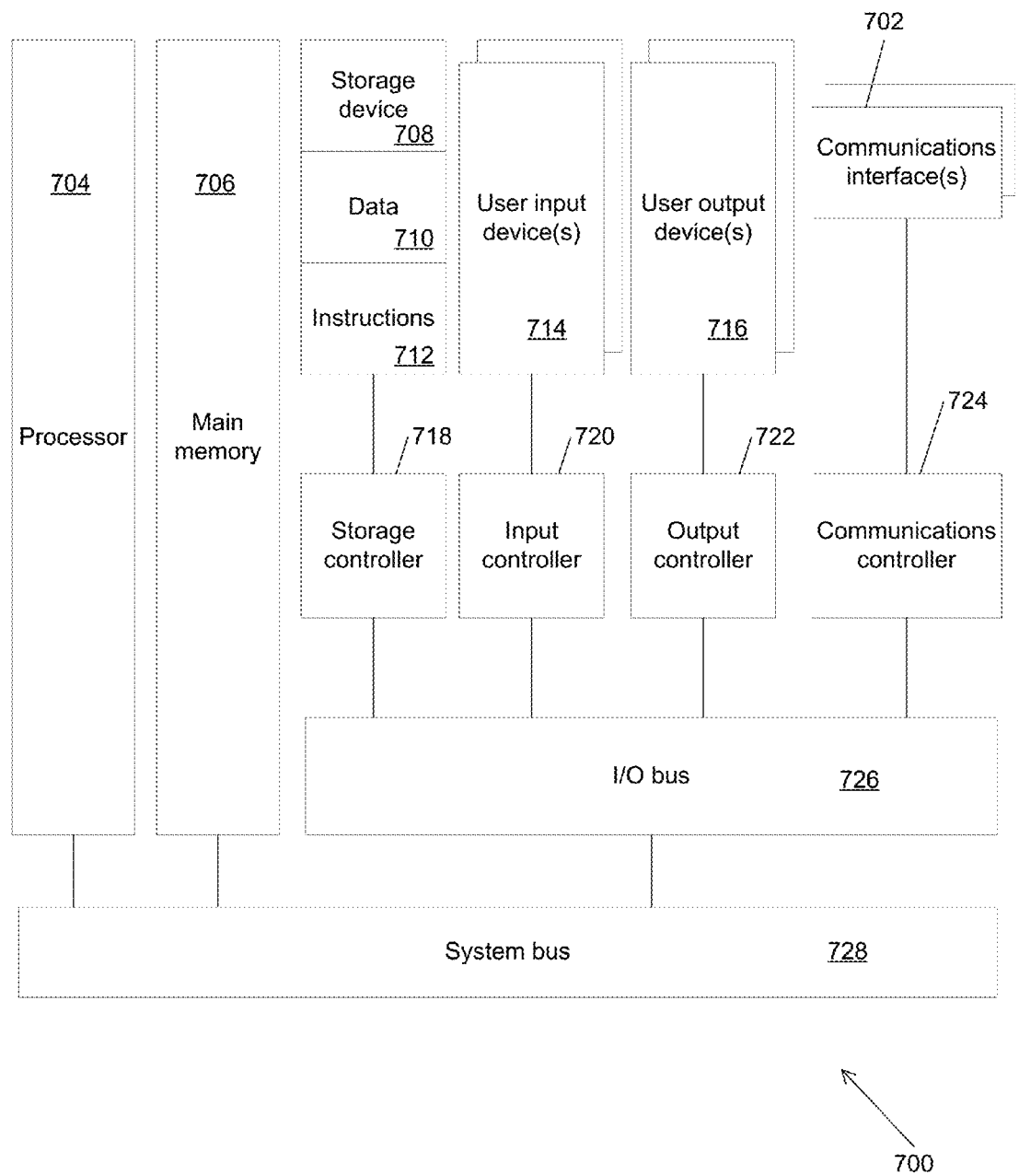
FIG. 6 illustrates a hardware architecture diagram of a processing apparatus in accordance with an embodiment of the invention.

Any of a variety of processing apparatuses can host various components of an anti-sandbagging hybrid game and/or an anti-sandbagging module in accordance with embodiments of the invention. In several embodiments, these processing apparatuses can include, but are not limited to, a gaming machine, a console game, a personal computing device such as a smartphone or a personal digital assistant, a general purpose computer, a computing device and/or a controller. A processing apparatus that is constructed to implement an anti-sandbagging hybrid game in accordance with an embodiment of the invention is illustrated in FIG. 6. In the processing apparatus 700, a processor 704 is coupled to a memory 706 by a bus 728. The processor 704 is also coupled to non-transitory processor-readable storage media, such as a storage device 708 that stores processor-executable instructions 712 and data 710 through the system bus 728 to an I/O bus 726 through a storage controller 718. The processor 704 is also coupled to one or more interfaces that may be used to connect the processor to other processing apparatuses as well as networks as described herein. The processor 704 is also coupled via the bus to user input devices 714, such as tactile devices including but not limited to keyboards, keypads, foot pads, touch screens, and/or trackballs, as well as non-contact devices such as audio input devices, motion sensors and motion capture devices that the processing apparatus may use to receive inputs from a user when the user interacts with the processing apparatus. The processor 704 is connected to these user input devices 714 through the system bus 728, to the I/O bus 726 and through the input controller 720. The processor 704 is also coupled via the bus to user output devices 716 such as (but not limited to) visual output devices, audio output devices, and/or tactile output devices that the processing apparatus uses to generate outputs perceivable by the user when the user interacts with the processing apparatus. In several embodiments, the processor is coupled to visual output devices such as (but not limited to) display screens, light panels, and/or lighted displays. In a number of embodiments, the processor is coupled to audio output devices such as (but not limited to) speakers, and/or sound amplifiers. In many embodiments, the processor is coupled to tactile output devices like vibrators, and/or manipulators. The processor is connected to output devices from the system bus 728 to the I/O bus 726 and through the output controller 722. The processor 704 can also be connected to a communications interface 702 from the system bus 728 to the I/O bus 726 through a communications controller 724.

In various embodiments, a processor loads the instructions and the data from the storage device into the memory and executes the instructions and operates on the data to implement the various aspects and features of the components of a gaming system as described herein. The processor uses the user input devices and the user output devices in accordance with the instructions and the data in order to create and operate user interfaces for players, casino operators, and/or owners as described herein.

Although the processing apparatus is described herein as being constructed from a processor and instructions stored and executed by hardware components, the processing apparatus can be composed of only hardware components in accordance with many embodiments. In addition, although the storage device is described as being coupled to the processor through a bus, those skilled in the art of processing apparatuses will understand that the storage device can include removable media such as but not limited to a USB memory device, an optical CD ROM, magnetic media such as tape and disks. Also, the storage device can be accessed through one of the interfaces or over a network. Furthermore, any of the user input devices or user output devices can be coupled to the processor via one of the interfaces or over a network. In addition, although a single processor is described, those skilled in the art will understand that the processor can be a controller or other computing device or a separate computer as well as be composed of multiple processors or computing devices.

In numerous embodiments, any of an RWE, a GWE, ESE and anti-sandbagging module as described herein can be implemented on multiple processing apparatuses, whether dedicated, shared or distributed in any combination thereof, or may be implemented on a single processing apparatus. In addition, while certain aspects and features of element management processes described herein have been attributed to an RWE, a GWE, an ESE or an anti-sandbagging module these aspects and features may be implemented in a hybrid form where any of the features or aspects may be performed by any of a RWE, GWE, ESE or anti-sandbagging module within an anti-sandbagging hybrid game without deviating from the spirit of the invention.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. An electromechanical gaming machine constructed to provide an anti-sandbagging wagering system and to receive real world credit from a user, comprising:
    an entertainment controller operatively connected to a game world controller, wherein the entertainment controller is constructed to:
    provide to the user a skill-based entertainment game;
    record the user's identification information;
    generate a graphical display for the skill-based entertainment game;
    receive the user's interaction with the skill-based entertainment game;
    determine the user's level of skill;
    associate the user's skill level with the user's identification information;
    communicate the user identification information and skill level to the game world controller; and
    generate a graphical display of a user identity confirmation;
    a real world controller operatively connected to the game world controller wherein the real world controller is constructed to:
    receive from the game world controller a trigger of a wager of the received real world credit;
    determine a gambling outcome for the wager of real world credit in response to the trigger using a random number generator; and
    communicate to the game world controller, the gambling outcome;
    allocate the randomly generated payout of real world credits to a credit meter; and
    the game world controller operatively connecting the entertainment controller and the real world controller, wherein the game world controller is constructed to:
    communicate to the real world controller an instruction to execute the wager on the basis of the user's interaction with the skill-based entertainment game;
    receive from the entertainment controller the user identification information and skill level;
    generate an anti-sandbagging provision that triggers the user identity confirmation;
    apply the anti-sandbagging provision to the user identification information and skill level;
    perform the user identity confirmation; and
    communicate to the entertainment controller the user identity confirmation.

2. The electromechanical gaming machine of claim 1, wherein the user skill level is determined by a game world credit outcome of the user's execution of the skill-based entertainment game.

3. The electromechanical gaming machine of claim 1, wherein the anti-sandbagging provision is triggered if the user's determined skill level is a significant deviation from expected user skill level.

4. The electromechanical gaming machine of claim 3, wherein the expected user skill level is based upon historical user skill level.

5. The electromechanical gaming machine of claim 1, wherein the user identity confirmation uses biometric measurements.

6. The electromechanical gaming machine of claim 5, wherein the biometric measurements are take prior to the skill-based entertainment game and associated with a unique identification number.

7. The electromechanical gaming machine of claim 5, wherein the biometric measurements are periodically triggered.

8. The electromechanical gaming machine of claim 5, wherein the biometric measurements include a retinal scan.

9. The electromechanical gaming machine of claim 5, wherein the biometric measurements include an iris measurement.

10. The electromechanical gaming machine of claim 5, wherein the biometric measurements include a fingerprint.

11. The electromechanical gaming machine of claim 5, wherein the biometric measurements include a palm print.

12. The electromechanical gaming machine of claim 5, wherein the biometric measurements include a facial recognition.

13. The electromechanical gaming machine of claim 5, wherein the biometric measurements include a voice print.

14. The electromechanical gaming machine of claim 1, wherein the user identity confirmation uses security questions.

15. The electromechanical gaming machine of claim 1, wherein the user identity confirmation uses geographic location data.

16. The electromechanical gaming machine of claim 1, wherein if the user identify confirmation fails, a warning is issued to the user through the game world controller.

17. The electromechanical gaming machine of claim 1, wherein if the user identify confirmation fails more than once, a penalty is assessed by the game world controller.

18. The electromechanical gaming machine of claim 1, wherein the game world controller and the real world engine controller are constructed using a same processing apparatus.

* * * * *